United States Patent [19]

Frandeen

[11] Patent Number: 5,606,685

[45] Date of Patent: Feb. 25, 1997

[54] COMPUTER WORKSTATION HAVING DEMAND-PAGED VIRTUAL MEMORY AND ENHANCED PREFAULTING

[75] Inventor: James W. Frandeen, Soquel, Calif.

[73] Assignee: Unisys Corporation, Blue Bell, Pa.

[21] Appl. No.: 174,855

[22] Filed: Dec. 29, 1993

[51] Int. Cl.$^6$ ....................................................... G06F 12/08
[52] U.S. Cl. ............................ 395/444; 395/464; 395/463; 395/497.02
[58] Field of Search ..................................... 395/400, 425, 395/444, 464, 460, 486, 440, 445, 463, 487, 497.02

[56] References Cited

U.S. PATENT DOCUMENTS

| | | | |
|---|---|---|---|
| 4,422,145 | 12/1983 | Sacco et al. | 364/300 |
| 4,467,411 | 8/1984 | Fry et al. | 395/250 |
| 4,722,047 | 1/1988 | Chan et al. | 395/400 |
| 4,742,447 | 5/1988 | Duvall et al. | 395/375 |
| 4,918,688 | 4/1990 | Krause et al. | 370/76 |
| 4,972,316 | 11/1990 | Dixon et al. | 395/425 |
| 5,193,172 | 3/1993 | Arai et al. | 395/478 |
| 5,237,673 | 8/1993 | Orbits et al. | 395/425 |
| 5,269,013 | 12/1993 | Abramson et al. | 395/425 |
| 5,276,840 | 1/1994 | Yu | 395/425 |
| 5,388,242 | 2/1995 | Jennett | 395/425 |

OTHER PUBLICATIONS

*Exploring CTOS*, by E. I. Miller, et al., Prentice Hall, Englewood Cliffs, New Jersey, 1991.
*Operating System Concepts*, by Peterson and Silberschatz, Addison–Wesley Publishing Co., Reading, MA, 1985, p. 125.

Primary Examiner—Eddie P. Chan
Assistant Examiner—Hiep T. Nguyen
Attorney, Agent, or Firm—Nathan Cass; Mark T. Starr

[57] ABSTRACT

A CTOS network comprised of a plurality of workstations provides for virtual demand paging transparently across the network in a manner which permits a large virtual memory to efficiently be provided for each of a plurality of concurrently running applications on a CTOS workstation. Each application running on the workstation is provided with assigned pages and a local clock which operates based on the well known clock algorithm. A unique combination of local policy and global policy is used for page replacement which results in significantly more efficient management of available memory pages. The global policy includes an "elbow room" enhancement which permits the global page replacement policy to better take into account the individual activity of the concurrently running applications. In addition, enhanced prefaulting and page cleaning are provided, whereby it is made significantly more likely that a running application will find a requested page in its local clock.

11 Claims, 19 Drawing Sheets

PAGE TABLE

| PAGE NO. | ACCESS BIT | DIRTY BIT | OTHER PAGE INFO |
|---|---|---|---|
| p1 | a1 | d1 | o1 |
| p2 | a2 | d2 | o2 |
| ⋮ | ⋮ | ⋮ | ⋮ |
| pn | an | dn | on |

| C1 | C2 | C3 | C4 | C5 |
|---|---|---|---|---|
| APPLICATION | FOREGROUND/ BACKGROUND | FREE PAGES | LEAST RESENT PAGE FAULT ORDER | ELBOW ROOM VALUE |
| A1 | BKD | 2 | 2 | 3 |
| A2 | FGD | 7 | 3 | 4 |
| A3 | BKD | 5 | 1 | 2 |
| ⋯ | ⋯ | ⋯ | ⋯ | ⋯ |
| AN | BKD | 6 | 4 | 5 |

GLOBAL TABLE

FIG. 11

| PAGE NO. | PAGE PРЕSENT | FILE # |
| --- | --- | --- |
| ⋮ | ⋮ | ⋮ |
| 14 | 1 | 5 |
| 15 | 0 | 5 |
| 16 | 0 | 6 |
| 17 | 0 | 6 |
| 18 | 0 | 6 |
| 19 | 0 | 6 |
| 20 | 0 | 6 |
| 21 | 0 | 6 |
| 22 | 0 | 9 |
| 23 | 1 | 9 |
| ⋮ | ⋮ | ⋮ |

FIG. 22

COMPUTER WORKSTATION HAVING DEMAND-PAGED VIRTUAL MEMORY AND ENHANCED PREFAULTING

RELATED U.S. PATENT APPLICATIONS

This patent application contains subject matter related to my copending patent applications Ser. No. 017,068, filed Feb. 12, 1993, Ser. No. 08/100,826, filed Aug. 2, 1993, and Ser. No. 08/176,139 filed concurrently herewith.

BACKGROUND OF THE INVENTION

The present invention relates generally to improved methods and apparatus for providing a demand-paged virtual memory in a computer workstation.

Modern-day workstations are typically capable of running a plurality of applications at one time. Each application normally requires its own memory in order to run the application. If a running application should use up all of the workstation's available memory, the application will usually be caused to wait or terminate, which may significantly slow up performance of the application, or require that the application be rerun when sufficient memory becomes available. An additional problem that can occur with a workstation running a plurality of applications is that, when a new application is initiated at the workstation and there is insufficient memory available, a running application will be forced to terminate and be swapped out in order to permit the new application to run. Such situations make it important that a workstation provide sufficient memory to run all of the applications which the user intends be run at the same time. As a result, a workstation normally has to be provided with sufficient total memory to run all of the applications that a user may wish to run at the same time without the workstation's memory becoming oversubscribed.

One known way of increasing the memory available to a computer workstation is to provide a virtual memory arrangement which permits the workstation to use memory which is not currently available in the workstation's main memory. For example, it is known to use a paging arrangement wherein the workstation's main memory is capable of storing a prescribed number of pages, one or more of which may be swapped with those contained, for example, on a disk drive attached to the workstation. When an application running on the workstation requests a page which is "not present" in the workstation's main memory, a situation commonly known as a page fault occurs. The workstation's operating system resolves this page fault by reading in the "not present" page from the disk into a free page (i.e., a page not currently in use) in the workstation's main memory. If the workstation does not have a free page, then the "not present" page is caused to replace a page in the workstation's memory. The particular workstation page which is replaced is determined based on an algorithm that attempts to choose for replacement a page which is not likely to be needed. One well known algorithm for this purpose is the "least recently used" (LRU) algorithm which replaces a page in a workstation's main memory based on the page which has been least recently used. This algorithm is typically implemented by providing a stack which links pages based upon usage.

A significant disadvantage of such an (LRU) algorithm is that it requires a significant amount of processing overhead for its implementation. In addition, this LRU algorithm does not work well when a workstation is running a plurality of applications, since the "least recently used" approach does not take application priorities into account and thus can cause pages to be replaced from a running application at an inappropriate time.

Another known type of page replacement algorithm is commonly referred to as a "clock" algorithm, wherein memory pages are arranged in a single circular list (like the circumference of a clock). The clock pointer (or hand) points to the last page replaced, and moves clockwise when the algorithm is invoked to find the next replacement page. When a page is tested for replacement, the access bit in the corresponding page table entry is tested and reset. If the page has been referenced since the last test, the page is considered to be part of the current working set, and the pointer is advanced to the next page. If the page has not been accessed, and is not "dirty" (i.e., does not need to be written back to its backup store) it is eligible for replacement. While this clock algorithm requires less overhead than the LRU algorithm, it still does not perform well for a workstation running a plurality of applications at the same time.

SUMMARY OF THE INVENTION

A broad object of the present invention is to provide improved methods and apparatus for providing memory in a workstation capable of running a plurality of applications.

A more specific object of the invention in accordance with the foregoing object is to provide improved demand-paged virtual memory for a workstation running a plurality of applications.

Another object of the invention, in accordance with one or more of the foregoing objects, is to provide an improved demand-paged virtual memory for a workstation connected in a network comprised of a plurality of workstations.

A further object of the invention, in accordance with one or more of the foregoing objects, is to provide an improved demand-paged virtual memory in a CTOS network comprised of a plurality of workstations.

In my copending patent application Ser. No. 08/017,068, filed Feb. 12, 1993, a highly advantageous embodiment of a demand-paged virtual memory is disclosed as applied to a CTOS network of workstations wherein the networking capability is built into the operating system. An operating system of this type is currently available from Unisys Corporation, Blue Bell, Pa. and is designated by the registered trademark CTOS®. Hardware, software and programming details for CTOS are available from Unisys Corporation. Also, a basic description of CTOS can be found in the book, *Exploring CTOS*, by E. I. Miller, et al., Prentice Hall, Englewood Cliffs, N.J., 1991. The contents of this book are incorporated herein.

In the preferred embodiment disclosed in my aforementioned application Ser. No. 08/017,068, a virtual demand-paged virtual memory is transparently provided for a workstation in a CTOS operating system. Each application running on the workstation is provided with assigned pages and a local clock. A unique combination of local policy and global policy is then used for page replacement in a manner which permits an efficient, very large virtual memory employing demand paging to be seamlessly provided for each of a plurality of applications running on the workstation. In addition, pages which are not present at the workstation may be transparently obtained across the network from a disk drive located at a server. This facilitates use of a diskless CTOS workstation if desired.

In my aforementioned copending patent application Ser. No. 08/100,826, a very significant improvement is provided in the demand-paged virtual memory system disclosed in Ser. No. 08/017,068, wherein the combined local and global page replacement is greatly enhanced by the provision of an "elbow room" capability for each application which permits the global page replacement policy to better take into account the individual activity of the running applications.

The aforementioned copending concurrently filed patent application Ser. No. 08/176,139 provides a further improvement in the demand-paged virtual memory systems disclosed in the aforementioned applications, wherein enhanced page cleaning is provided in association with the combined local and global page replacement in a highly advantageous manner, whereby a greater number of pages are made available for use by running applications.

The present invention provides a still further improvement in the demand-paged virtual memory systems disclosed in the aforementioned copending applications, wherein enhanced page prefaulting is provided in association with the combined local and global page replacement in a highly advantageous manner, whereby it is made significantly more likely that a running application will find a requested page in its local clock.

The specific nature of the invention as well as other objects, features, advantages and uses thereof will become evident from the following description of a preferred embodiment taken in conjunction with the accompanying drawings.

BRIEF DESCRIPTION OF THE DRAWINGS

FIG. 11 illustrates the global table GT of FIG. 10 having exemplary values.

FIG. 22 is a schematic diagram of a page table portion for illustrating operation of FIG. 21 for a specific example.

DESCRIPTION OF A PREFERRED EMBODIMENT

Like numbers and characters, correspond to like elements throughout the figures of the drawings.

A preferred embodiment of the present invention will be described as applied to the embodiments disclosed in my aforementioned patent applications Ser. No. 08/017,068 and 08/100,826, and 08/176,139. Accordingly, the embodiments disclosed in these applications will initially be described, the preferred embodiment of Ser. No. 08/017,068 being described with reference to FIGS. 1–9, the elbow room enhancement provided by the preferred embodiment disclosed in Ser. No. 08/100,826 being described with reference to FIGS. 10–12, and the page cleaning enhancement provided by the preferred embodiment disclosed in the concurrently filed Ser. No. 08/176,139 being described with reference to FIGS. 13–18.

Figure 1:
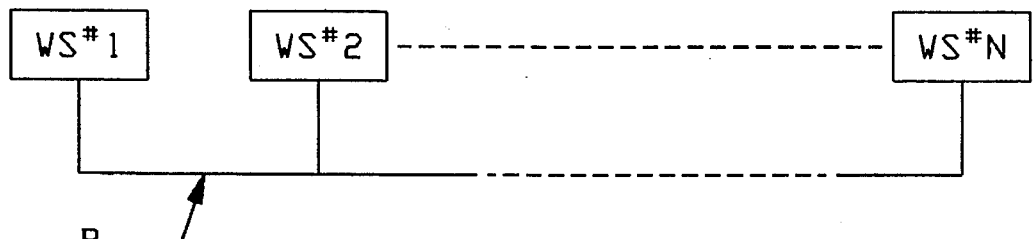
FIG. 1 is a block diagram of a CTOS cluster comprising a plurality of workstations.

FIG. 1 illustrates a CTOS cluster comprised of a network of N desktop workstations WS#1 - - - WS#N, wherein one of the workstations (e.g., WS#1) is designated as the server workstation. CTOS runs on these workstations using the Intel® family of 80X86 microprocessors. CTOS is a modular, message-based operating system having a built-in networking capability which is transparent to the user.

The CTOS cluster illustrated in FIG. 1 is implemented through a simple bus topology B with RS-422/485 connections. Alternatively, the CTOS cluster may be implemented using twisted pair (telephone wiring) as described in U.S. Pat. No. 4,918,688.

CTOS has a very small kernel, or group of primitive operations. Most of the CTOS system environment is made up of modules called system services. These system services manage resources (the file system, communication, etc.) and provide services that are requested by application program processes and by other system service processes.

A system running CTOS has multiple processes or threads of execution. A process is an independent thread of execution, together with the hardware and software context necessary to that thread. A message is passed from one process to another via an exchange. An exchange is like a mailbox where processes wait to receive messages, or where messages are deposited to wait to be processed. Each process is allocated an exchange when it is created. CTOS uses a special type of message, the request for service, which is the most commonly used CTOS message. These requests are specially formatted messages that include a request block header having a request code which identifies the desired system service, along with other information that will be needed by the service, such as where to send the response and who is sending the request. With the help of the CTOS kernel, the request travels transparently to the user or application program across the network to locate any special service.

An application running on a CTOS workstation may include a plurality of processes. For example, an electronic mail application may typically have at least two processes. One process allows the user to edit a mail message, while the other process monitors incoming mail. These electronic mail processes compete with each other for use of the workstation microprocessor as well as with processes from other running applications (such as a word processor application and a compiler application). Since a CTOS workstation typically contains only a single microprocessor (e.g., a 80486 Intel® processor), process scheduling is required in order to permit a plurality of applications to run on the workstation at the same time. This is performed by the CTOS kernel scheduler. Each process (thread of execution) within CTOS is assigned a priority and is scheduled for execution by the microprocessor based upon that priority. Process scheduling is driven by events. Whenever an event occurs during execution of a process, such as an input/output event, the executing process can lose control of the processor in favor of a higher-priority process. This type of scheduling is called event-driven, priority-ordered scheduling.

In CTOS, the functions normally associated with an operating system are performed by system services which manage resources and provide services that are requested by application program processes and other system service processes. They communicate with their application program clients using the previously described messages. Examples of CTOS system services include opening or closing disk files or accepting keyboard input. Because of their standard message-based interfaces, system services can be loaded dynamically, substituted for, or removed as desired. The manner of providing a system service in a CTOS operating system is well known to those familiar with CTOS.

A particular advantage made possible by CTOS's built-in networking is that a system service can operate transparently across a network to the process that requests its service. For example, an application process on one workstation can send off a request message to a system service to have a certain job performed without knowledge of where the system service resides. If the service does not reside on the local workstation, the request message is automatically routed across the network to the workstation where the service resides. The response message returns in the same way.

In prior art CTOS systems, each application running on a workstation resides in a particular assigned partition of the workstation memory. In addition, a particular portion of the workstation memory is assigned to each application for use in running the application. Although it has been generally recognized that virtual demand-paging could be provided on CTOS systems using 80386 Intel® (and later) microprocessors, it was not provided due to the belief that overall performance would not be sufficiently enhanced. While virtual demand-paging is applicable to other types of operating systems, it is particularly advantageous when used in a CTOS system, since it significantly enhances CTOS performance at a workstation running a plurality of applications.

An advantageous way of providing virtual demand-paging for a CTOS workstation will next be described. Preferably, this paging capability is provided for CTOS as a system service that is used by all applications running at a workstation. The manner in which such a CTOS system service may be designed for implementing virtual-demand paging will become evident from the description provided herein. For this purpose, all available physical memory may be considered as divided, for example, into 4 KB (4,000-byte) pages.

Figure 2:
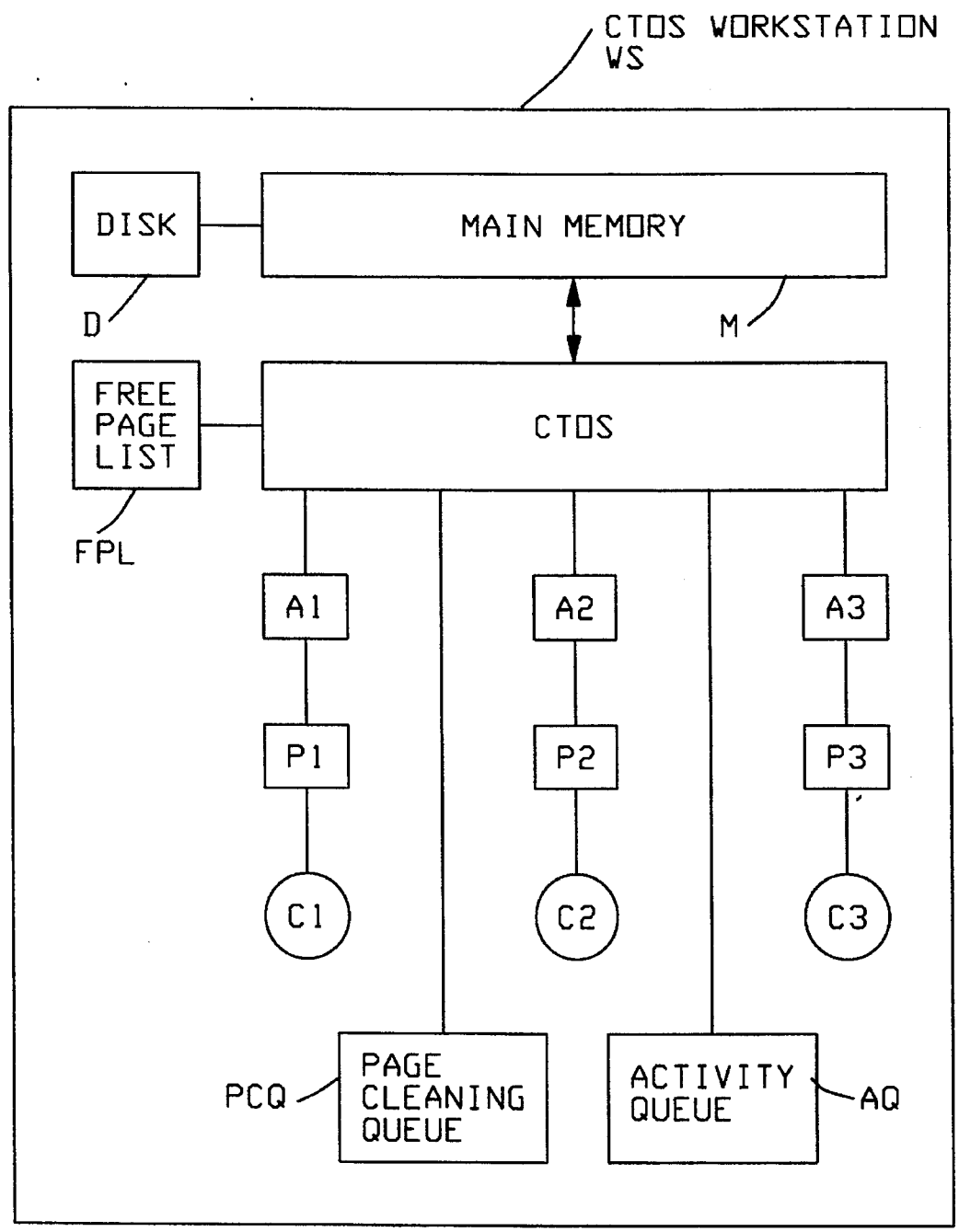
FIG. 2 is a block and schematic diagram illustrating a preferred embodiment of a CTOS workstation having a demand-paged virtual memory.

FIG. 2 schematically illustrates three applications A1, A2 and A3 and their associated pages running on a CTOS workstation WS having a main memory M and a local disk D. For example, A1 may be a word processor application program, A2 may be a compiler application program (such as used by a programmer for program development), and A3 may be a mail program for sending and receiving messages. As mentioned previously herein, an application may comprise one or more processes or threads. Accordingly, it is to be understood that the term "application" used herein is to be considered as also meaning an application processor thread of an application comprised of a plurality of processes or threads, each such application processor thread being able to employ demand paging as described herein for an application.

Each application (A1,A2,A3) in FIG. 2 is provided with a respective page table (P1,P2,P3) and a respective local clock (C1,C2,C3) for controlling page replacement. Each application typically is allowed a maximum number of assignable memory pages which it may use during execution. For example, word processor application program A1 may be allowed a maximum of 100 assigned pages, compiler application program A2 may be allowed a maximum of 70 assigned pages, and mail application program A3 may be allowed a maximum of 50 assigned pages. If memory M has a total of 120 assignable pages, the sum of the pages assigned to all running applications at any time cannot exceed 120 pages, regardless of whether an application has been assigned its maximum number of pages. Note that workstation WS in FIG. 2 also illustrates a free page list FPL for keeping track of page assignments, a page cleaning queue PCQ for cleaning dirty pages, and an activity queue AQ for indicating relative application activity. These will be further described hereinafter.

Figures 3, 4:
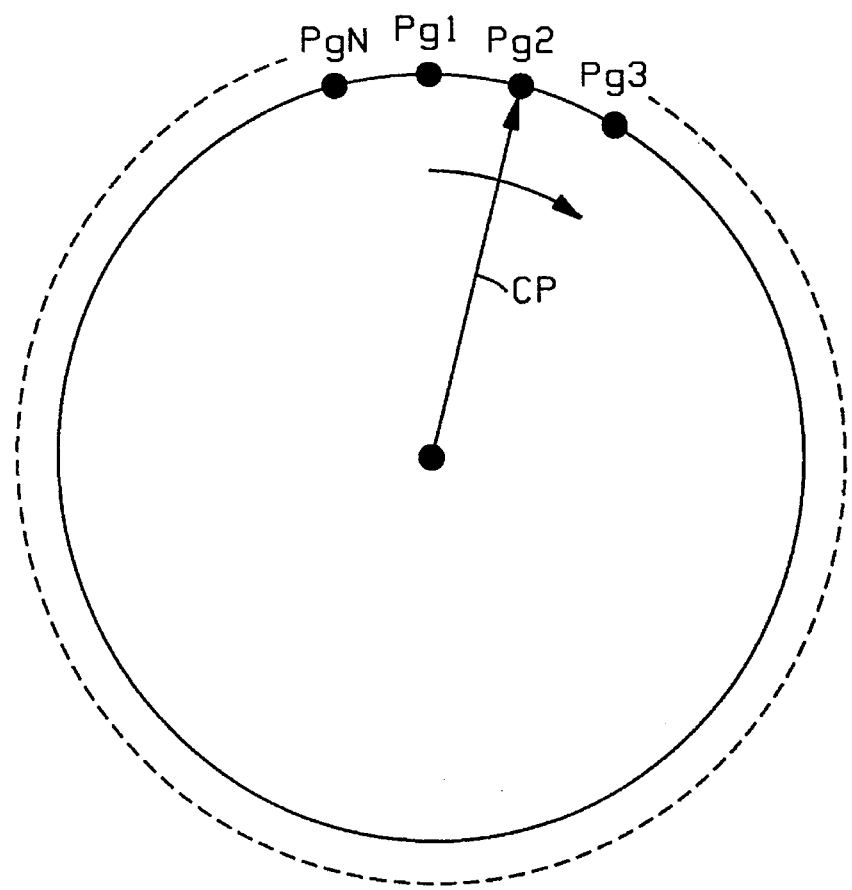
FIG. 3 illustrates a typical page table used by each application running on the CTOS workstation in FIG. 2.
FIG. 4 schematically illustrates the arrangement of a local clock provided for each application running on the CTOS workstation in FIG. 2.

FIG. 3 illustrates a typical page table (P1,P2,P3 in FIG. 2) which may be used by each application. As shown, each entry in the page table of FIG. 3 includes page identifying data $p_i$ identifying a particular assigned memory page, an access bit $a_i$ indicating whether the page was referenced by its application since the last test, and a "dirty" page bit $d_i$ indicating whether the page contains written-to data which must be written back to its source location, such as a disk drive. Each page table entry may also include other information indicated by $o_i$, such as its disk storage address, the application to which the page is assigned, whether the page is in the process of being cleaned, etc.

CTOS allocates a maximum number of assignable pages to an application when the application is started. CTOS also creates a local clock (C1,C2,C3 in FIG. 2) for the application at that time for use in determining which page of the application should be replaced when replacement is required. The basic arrangement of such a local clock is schematically illustrated in FIG. 4, wherein memory pages Pg1, Pg2, - - - PgN designating pages which have been assigned to the application are arranged in a circular list, like the circumference of a clock. The number of assigned memory pages is not permitted to exceed the maximum assignable pages for that application. The clock pointer (or hand) cp points to the last page replaced, and advances clockwise when the local clock is invoked to search for a replaceable page.

Figure 5:
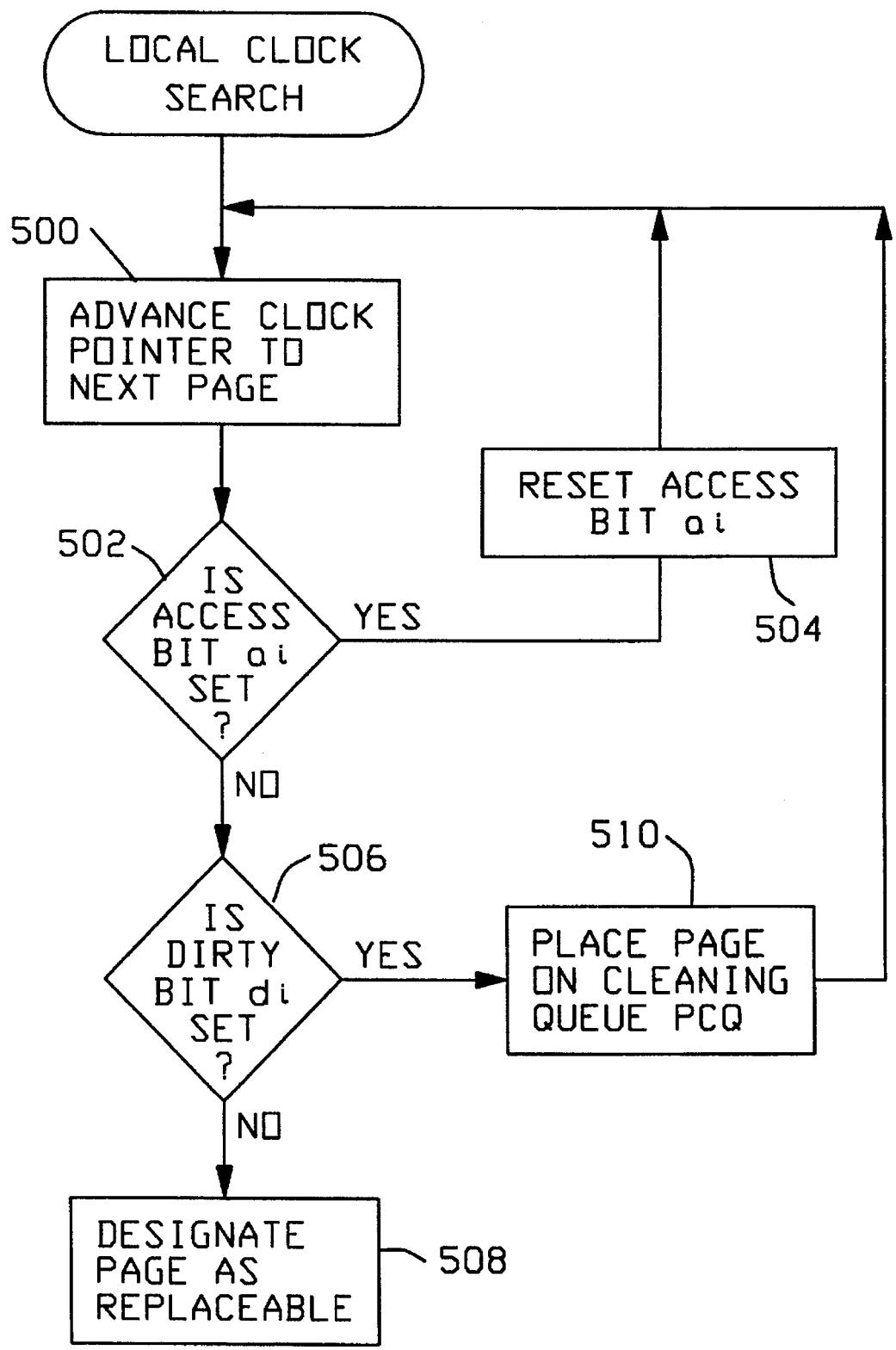
FIG. 5 is a flowchart illustrating the operation of the local clock illustrated in FIG. 4.

Operation during a local clock search for a replaceable page is illustrated by the flowchart in FIG. 5. When the clock pointer cp is advanced to the next page (Step 500), the setting of the access bit $a_i$ in the corresponding page table entry is tested (Step 502) to determine whether the page was referenced by the application since the last test. If this access bit $a_i$ is found to be set (Step 502), the page is considered to be a page of the currently active working pages of the application, and is thereby not eligible for replacement. In such case, this access bit $a_i$ is reset (Step 504), and the flow proceeds back to Step 500 to continue the search.

If, on the other hand, access bit $a_i$ of the next page is found not to be set in Step 502, the setting of the dirty page bit $d_i$ is then examined (Step 506). If bit $d_i$ is not set, indicating that the page is clean (i.e., it need not be written back to its source location, such as a disk), then the page is designated as being eligible for replacement (Step 508). However, if it is found in Step 506, that bit $d_i$ is set, indicating that the page is dirty, then the page is placed on the page cleaning queue PCQ (FIG. 2) (Step 510) and the flow returns to Step 500 to continue the search. A preferred way of accomplishing this page cleaning in accordance with the present invention will be described hereinafter with reference to FIGS. 13–15. A priority may be provided for pages in the cleaning queue PCQ so that certain pages in PCQ are cleaned ahead of others. After a page is cleaned, its bit $d_i$ in the page table of its respective application is reset to indicate that the page is now clean.

Next to be described is the implementation of FIGS. 6–9 wherein a combined global and local page replacement policy is provided using a local clock for each running application, as described above in connection with FIGS. 4 and 5. It will be assumed, as before, that a CTOS workstation having a maximum of 120 assignable pages has concurrently running thereon a word processor application A1, a compiler application A2 and a mail application A3 having assignable page maximums of 100, 50 and 30, respectively. When all three of these applications are running on a workstation, one of the applications will be running in the foreground (the foreground application being the one which controls the keyboard and usually at least some portion of the display screen), while the other two applications will be running in the background. For example, the word processor application could be running in the foreground, permitting a user to control the keyboard and display to perform word processing operations as if no other applications were running. The compiler and mail applications would then be running in the background. The compiler application could, for example, be compiling a special-purpose program previously developed by a user, while the mail application could be waiting for receipt of a mail message. If a mail message arrives, the user could be signaled of the receipt of this message by a flashing marker on the screen. The user may then, by appropriate keyboard entry, switch to the mail application program to read the message. The mail application would then be in the foreground while the word processor application would run in the background along with the compiler application.

Figure 6:
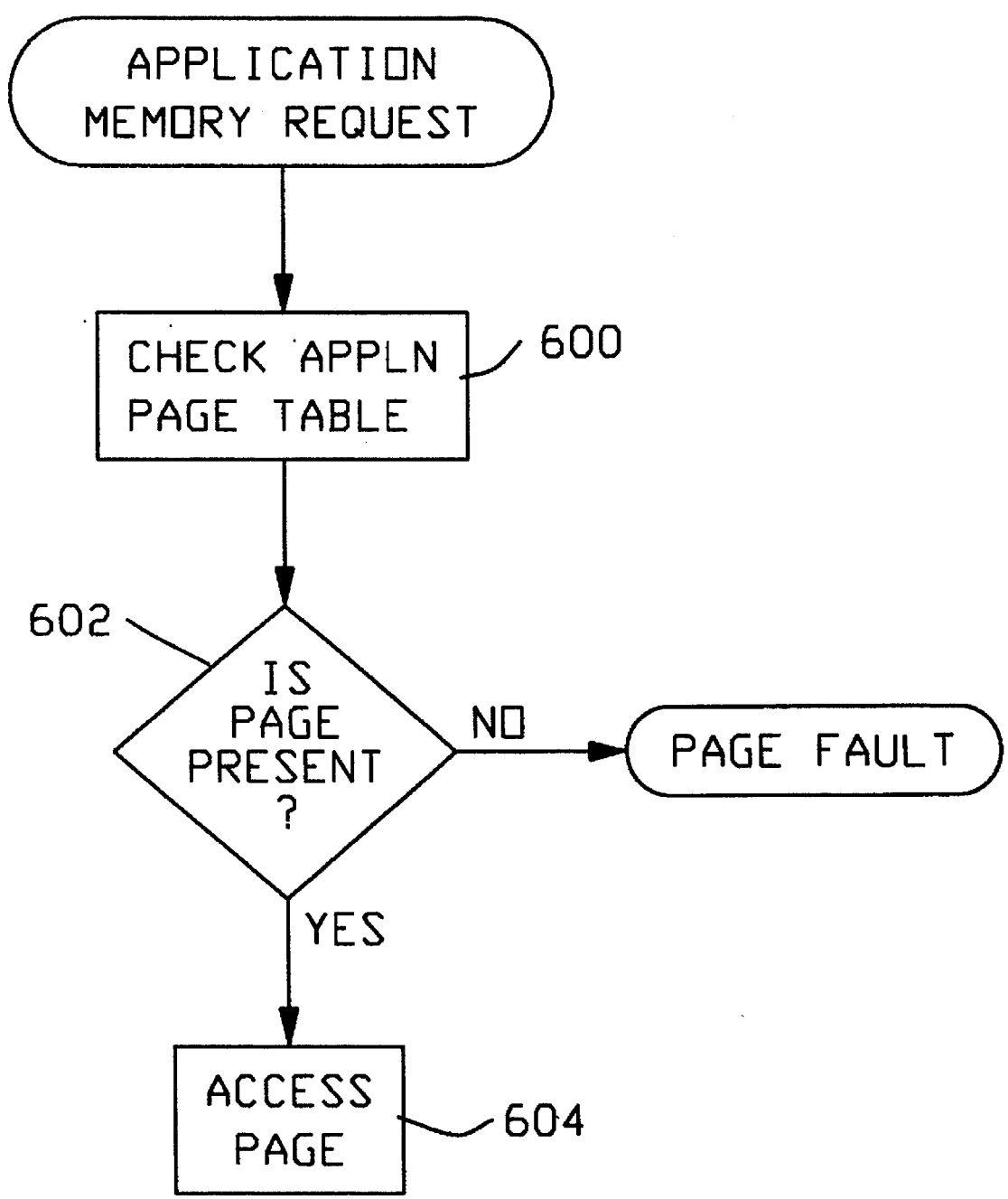
FIG. 6 is a flowchart illustrating the occurrence of a page fault as a result of an application requesting a "not present" memory page.

As illustrated in the flowchart of FIG. 6, whenever one of the running applications requests a memory access, the page table is checked (Step 600) to determine whether the page containing the information to be accessed is present in one of the application's assigned pages. If the page is found to be present (Step 602), the page is accessed by the application (Step 604). Otherwise, a page fault occurs causing operation to proceed to the flowchart of FIG. 7, which illustrates how a page fault is handled.

Figure 7:
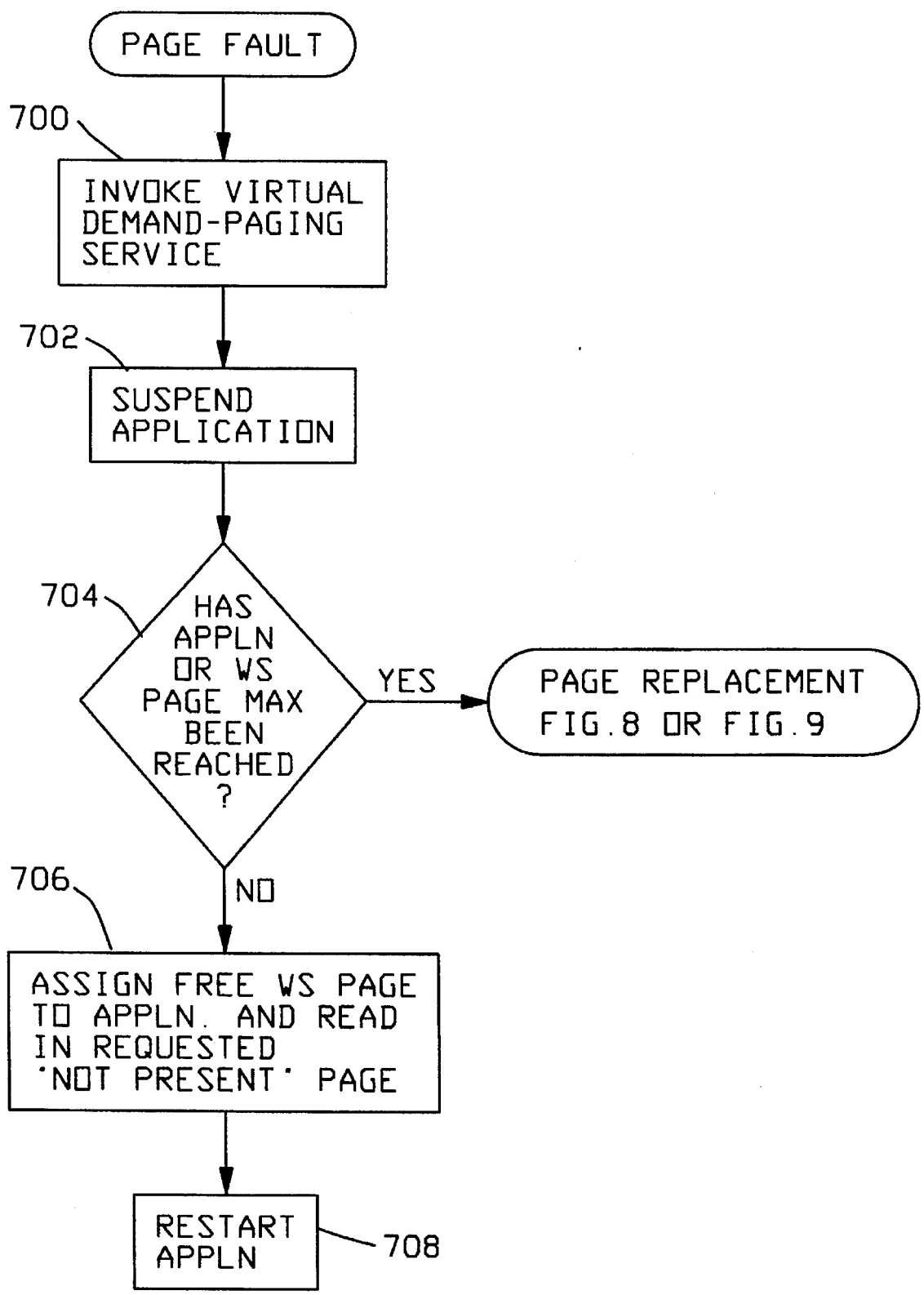
FIG. 7 is a flowchart illustrating operations occurring in response to the occurrence of a page fault.

As illustrated in FIG. 7, the occurrence of a page fault invokes the virtual demand-paging service (Step 700) which suspends performance of the application which caused the fault (Step 702). The paging service then checks to determine whether either the application or workstation page maximum has been reached (Step 704). If not, the paging service causes a free (unassigned) workstation memory page (indicated in the free page list FPL in FIG. 2) to be assigned to the application which experienced the fault, following which the requested page is read into this newly assigned page (Step 706). The application is then restarted (Step 708). Since a CTOS system is being used, this page may advantageously be obtained from a local disk at the workstation or transparently across the network from the server workstation.

Figure 8:
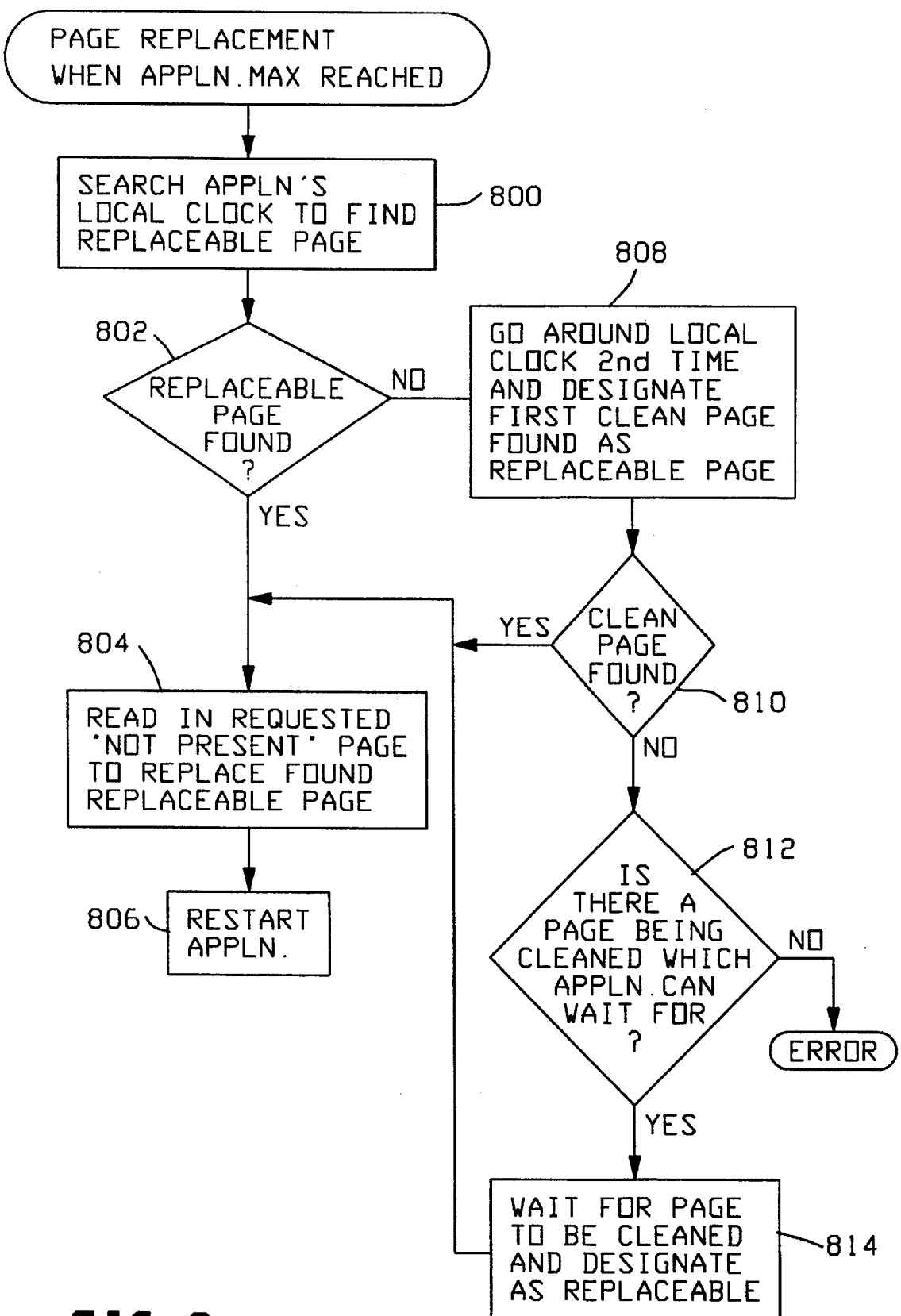
FIG. 8 is a flowchart illustrating how a page fault is handled when the application which caused the page fault has reached its maximum number of assigned pages.
Figure 9:
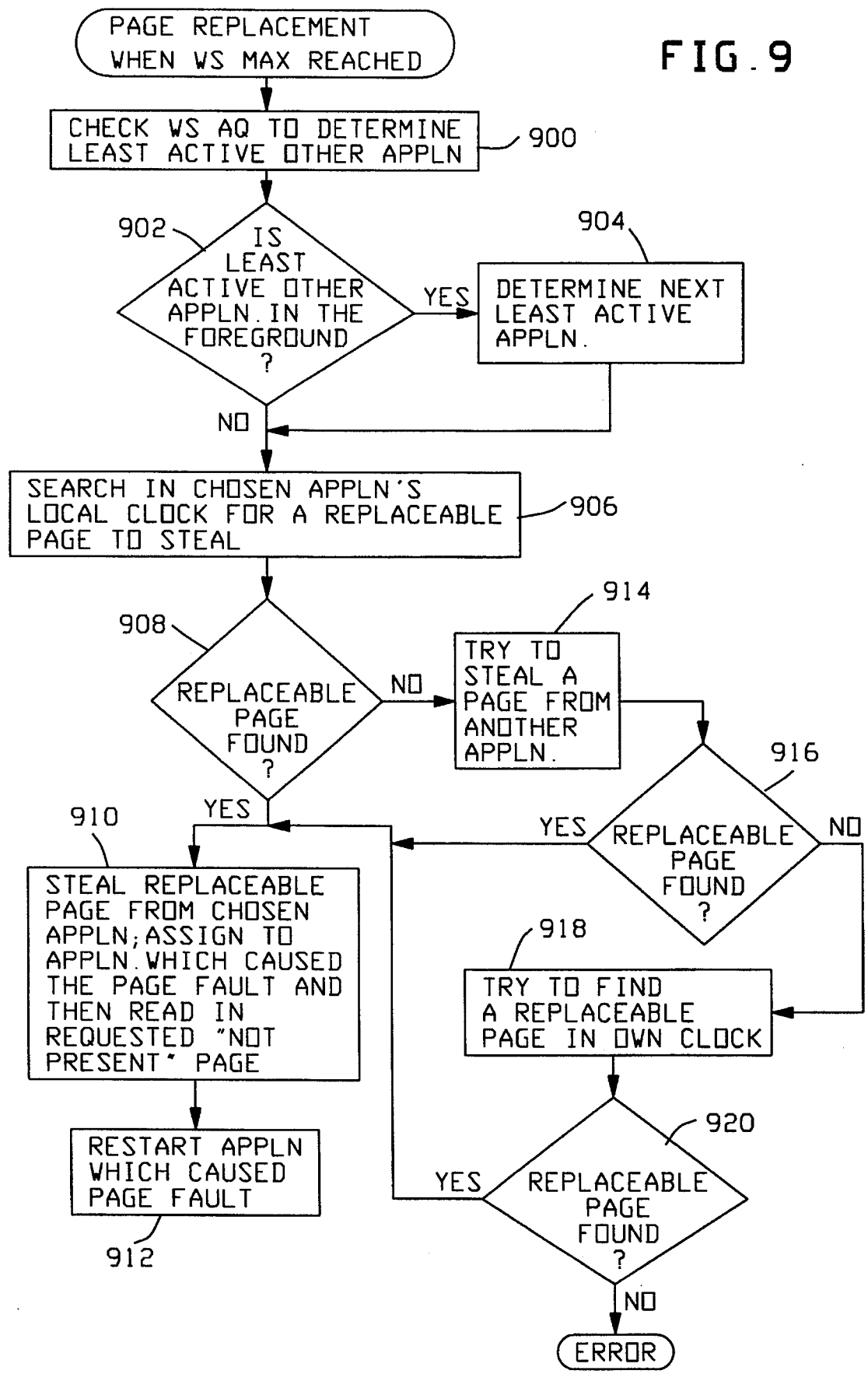
FIG. 9 is a flowchart illustrating how a page fault is handled when an application which causes a page fault has not reached its page maximum, but the workstation has used up its maximum number of assignable pages.

If, on the other hand, Step 704 in FIG. 8 finds that either an application or workstation page maximum had been reached, then page replacement is required, which is performed as illustrated in FIG. 8 or FIG. 9, depending on whether a page maximum was found for the application (FIG. 8) or for the workstation (FIG. 9). The application page maximum situation illustrated in FIG. 8 will be considered first.

As illustrated in FIG. 8, page replacement for the situation where the application has reached its assigned page maximum begins with the search for a replaceable page in the application's local clock (Step 800). This search is accomplished as previously described in connection with FIGS. 4 and 5. If a replaceable page is found in the application's local clock (Step 802), the "not present" page requested by the application is obtained (e.g., from the local or server disk) and read into the designated replaceable page (Step 804), following which the application is restarted (Step 806).

If, on the other hand, Step 802 in FIG. 7 finds no replaceable page after going all the way around the application's local clock, a second go-around of the local clock is initiated (Step 808). Since each page access bit $a_i$ was reset during the first go-around, the search for a replaceable page on the second go-around is based on finding the first occurring clean page (i.e., a page which does not have $d_i$ set). If a clean page is found, it is designated as a replaceable page (Step 810). The flow then proceeds to the previously described (Steps 804 and 806), wherein the "not present" page is read in to replace the found replaceable page, and the application restarted.

As illustrated in FIG. 8, if Step 810 indicates that no clean page was found during the second go-around of the application's local clock, the flow then proceeds to Step 812 to determine whether there is a page in the page cleaning queue PCQ (FIG. 2) for which the application can wait to be cleaned. If so, the application waits (Step 814) until the page is cleaned. A preferred way of accomplishing this page cleaning will be described hereinafter with reference to FIGS. 13–15. The cleaned page is then designated as replaceable and the flow then proceeds to Steps 804 and 806, as before, to read in the requested "not present" page to replace this designated replaceable page, and to restart the application. However, if Step 812 indicates that there is no page being cleaned which the application can wait for, an error indication is provided.

FIG. 9 illustrates how page replacement is handled for the second type of replacement situation where a page fault cannot be satisfied (even though the application's assigned page maximum has not been reached) because the workstation has used up its maximum number of assignable pages. It will be remembered that the previous example assumed that the workstation had a maximum of 120 assignable pages, while the word processor application A1 was allowed a maximum of 100 assigned pages, the compiler application A2 was allowed a maximum of 50 assigned pages and the mail application A3 was allowed a maximum of 30 assigned pages. For example, if applications A1, A2 and A3 have been assigned 80 pages, 30 pages and 10 pages, respectively, and a page fault occurs because the word processor application A1 requests a "not present" page, the workstation will not be able to satisfy this page fault because the workstation page maximum of 120 pages (80+30+10) has been reached. This is the type of page replacement situation to which FIG. 9 is directed.

Basically, the flow in FIG. 9 tries to steal a page from another application. For this purpose, the workstation activity queue AQ (FIG. 2) is first checked (Step 900) to determine which of the other applications running on the workstation is the least active. In the preferred embodiment being described, this activity queue AQ is designed to queue running applications in an order based on which application least recently experienced a page fault. For example, if word processor application A1 most recently had a page fault, and mail application A3 least recently had a page fault, then A3 will be the least active application, followed by A2 and lastly by A1. In such case, Step 900 in FIG. 9 will select A3 as the least active application from which to try to steal a page.

Step 902 in FIG. 9 checks whether the least active application selected in Step 900 is in the foreground (i.e., currently being used by the user) and, if so, chooses the next most active application (Step 904) from which to steal a page. The reason for not using a foreground application is that a foreground application, because of its foreground use, may imminently require access to its pages, and thus should not be subject to having one of its pages stolen.

Having thus identified the application from which a page is to be stolen (Steps 900,902,904), the flow in FIG. 9 proceeds to the chosen application's local clock (Step 906) to search for a replaceable page, which may be accomplished in a similar manner to that previously described in connection with FIGS. 4, 5 and 8. This search may be modified in various respects. For example, for the purpose of Step 906 in FIG. 9, the local clock page replacement search may be limited to just a single go-around of the local clock.

If a replaceable page is found (Step 908), the flow proceeds to Step 910 wherein the replaceable page found in Step 906 is stolen and assigned to the application which caused the page fault. The requested "not present" page is then read into this newly assigned page, and the application which caused the page fault is then restarted (Step 912).

If no replaceable page is found in Step 908, an attempt is made to steal a page from another application (Step 914). This is preferably accomplished by searching the local clocks of other applications (in a manner similar to that performed in Step 906) beginning with the next least active application which is not a foreground application, and so on to other applications until a replaceable page is found. The flow then returns to Step 910 to complete the steal. If a replaceable page is still not found (Step 916), then an attempt is made to find a replaceable page in the local clock of the application which caused the page fault (Step 918), as previously described in connection with FIG. 8. If Step 918 finds a replaceable page in the local clock of the application which caused the page fault, the flow proceeds to Step 910 wherein this replaceable page is used for reading in the requested "not present" page, and the application is then restarted (Step 912). However, if even Step 918 proceeds to Step 920 does not result in finding a replaceable page, the flow proceeds to Step 920 to provide an error indication. Alternatively, another search of the other applications could be made, as before, since a page that was previously not replaceable could have become replaceable. Such a repeat search could be performed before searching the local clock of the application which caused the fault.

It will be evident that the performance of the above disclosed global page replacement policy of the aforementioned patent application Ser. No. 08/017,068 is highly dependent upon the manner in which running applications steal pages from one another based on the global page replacement policy. In the embodiment described in the aforementioned copending patent application Ser. No. 08/100,826, performance is significantly enhanced by additionally providing an "elbow room" capability for each application which permits the global page replacement policy disclosed in Ser. No. 08/017,068 to better take into account the paging activity of each of the running applications. The preferred embodiment disclosed in Ser. No. 08/100,826 will next be described.

Initially, consider the situation where a background program (call it Thrasher) in the implementation of Ser. No. 08/017,068 is continually scanning through a huge memory array, causing a page fault on almost every access. Since Thrasher is causing continuous page faults, it may steal pages from every other background application that is accessing its pages relatively infrequently. When a user activates such a background application, the activated application may have few if any pages in memory, and its pages will need to be faulted in. While these pages are being faulted in, Thrasher should not be allowed to steal pages from this activated application. The "elbow room" approach provided by Ser. No. 08/100,826 solves this problem in a particularly advantageous manner, as will next be described with reference to FIGS. 10–12.

Figure 10:
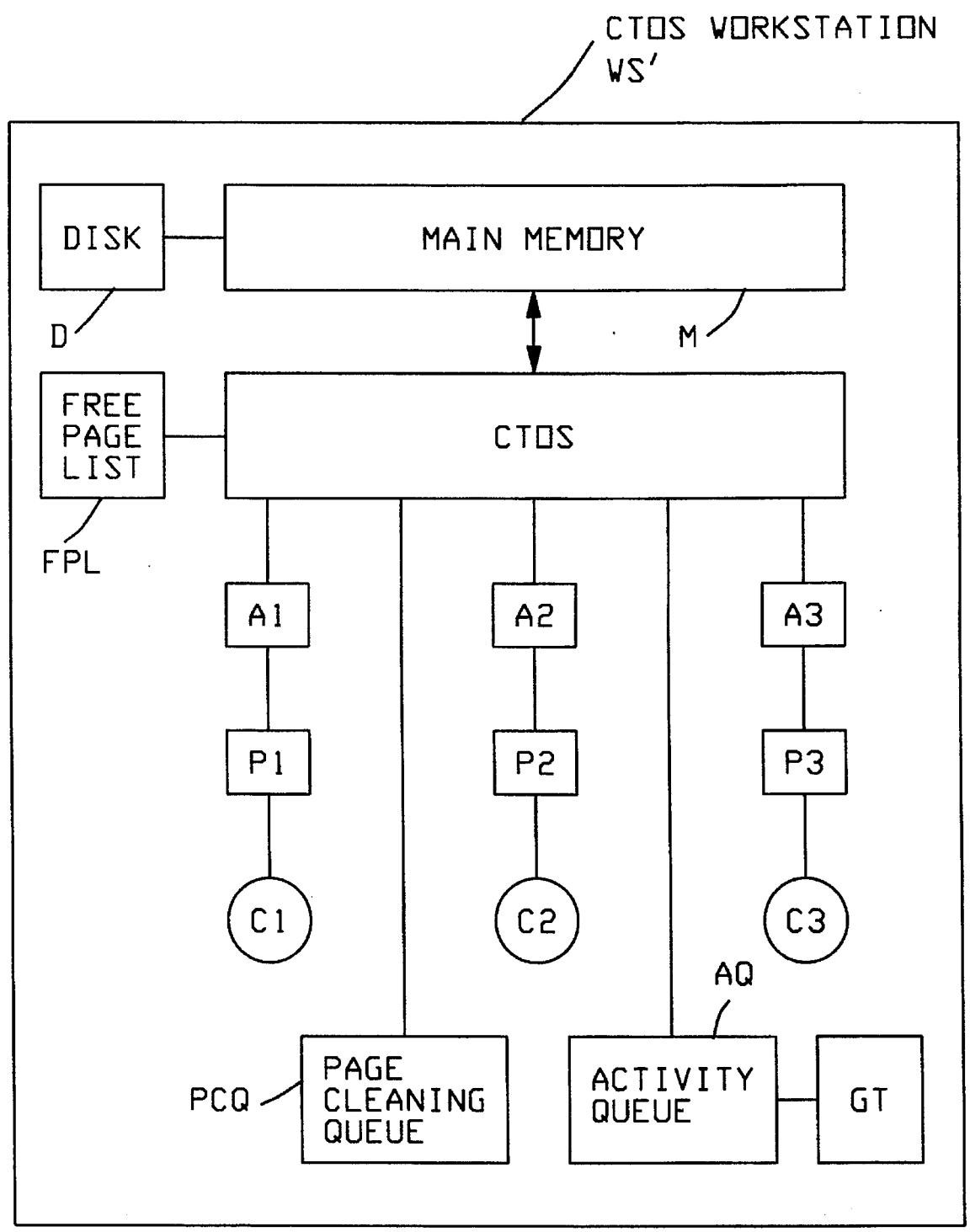
FIG. 10 is a block and schematic diagram of a workstation having a global table GT used in providing an "elbow room" capability for global page replacement purposes in accordance with the invention.

FIG. 10 illustrates a CTOS workstation WS', similar to that shown in FIG. 2, wherein a global table GT is used with an application activity queue AQ for determining the order for selecting candidate applications for stealing pages from applications running on the workstation WS'.

FIG. 11 illustrates typical values contained in a global table GT, such as indicated in FIG. 10. As shown, the first column C1 of the global table GT lists applications A1, A2, A3 - - - AN running on the workstation, WS'.

The second column C2 in FIG. 11 indicates whether an application is running in the foreground Fgd or background Bgd. As shown by column C1, application A2 is the foreground application.

The third column C3 in FIG. 11 indicates the number of free pages available to an application in the application's local clock. A free page is one which has been assigned to an application, but which is not currently in use or dirty (i.e., neither $a_i$ nor $d_i$ in FIG. 3 is set for that page). As shown by column C3, applications A1, A2, A3, AN have 2, 7, 5, 6 free pages, respectively.

Column C4 in FIG. 11 represents the application order provided by the activity queue AQ in FIG. 10, which is based on the application having the least most recent (oldest) page fault. The application order indicated in column C4 is 2, 3, 1, 4, wherein A3 is the application having the least recent (oldest) page fault.

Column C5 in FIG. 11 indicates the "elbow room" value currently in effect for each application. In order to understand the significance of this "elbow room" value, it is necessary to understand how it is provided. In a preferred embodiment, each application has an "elbow room" value associated with it, which may typically range from 2 to 7. Operation in accordance with the present invention is such that, during searching for an application from which to steal a page, an application will be skipped as a candidate if it does not have more free pages (column C3) than its current "elbow room" value (column C5). For example, in the global table GT illustrated in FIG. 11, it will be understood that application A1 would be skipped during a page stealing search, since it has only 2 free pages (column C3), which is less than its current "elbow room" value of 3 (column C5). This "elbow room" test would therefore prevent the problem presented by the previously considered Thrasher application, since Thrasher will not be able to steal a page from an application which does not have sufficient "elbow room".

Note that the other illustrated applications A2, A3 and AN in FIG. 11 have more free pages than their respective current "elbow room" values, and thus these applications would not be skipped when searching for a page to steal.

The "elbow room" value of an application is made to vary based on its page faulting activity. In a preferred embodiment, this is accomplished by increasing an application's "elbow room" value to its maximum value each time a page fault occurs. The maximum "elbow room" value may be the same for all running applications (e.g., seven), or some applications may be given greater "elbow room". If an application goes for a predetermined amount of time (e.g., five seconds) without a page fault, then its "elbow room" value is decreased by one, which continues until the minimum "elbow room" value is reached. This minimum value may, for example, be 2, and each application may have a different minimum.

Figure 12B:
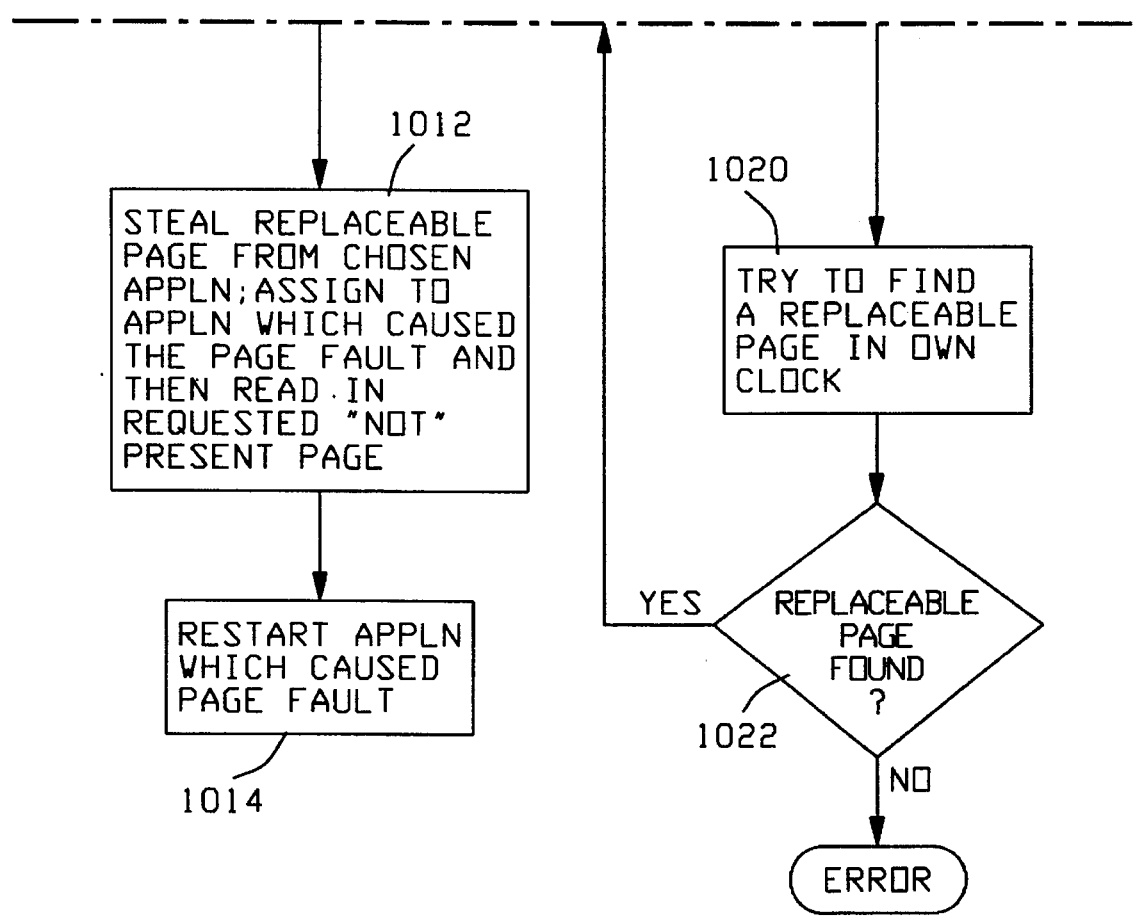
FIG. 12 is a flowchart illustrating how the "elbow room" capability of the invention operates during page replacement.
Figure 12:
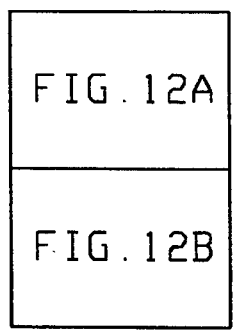
Figure 12A:
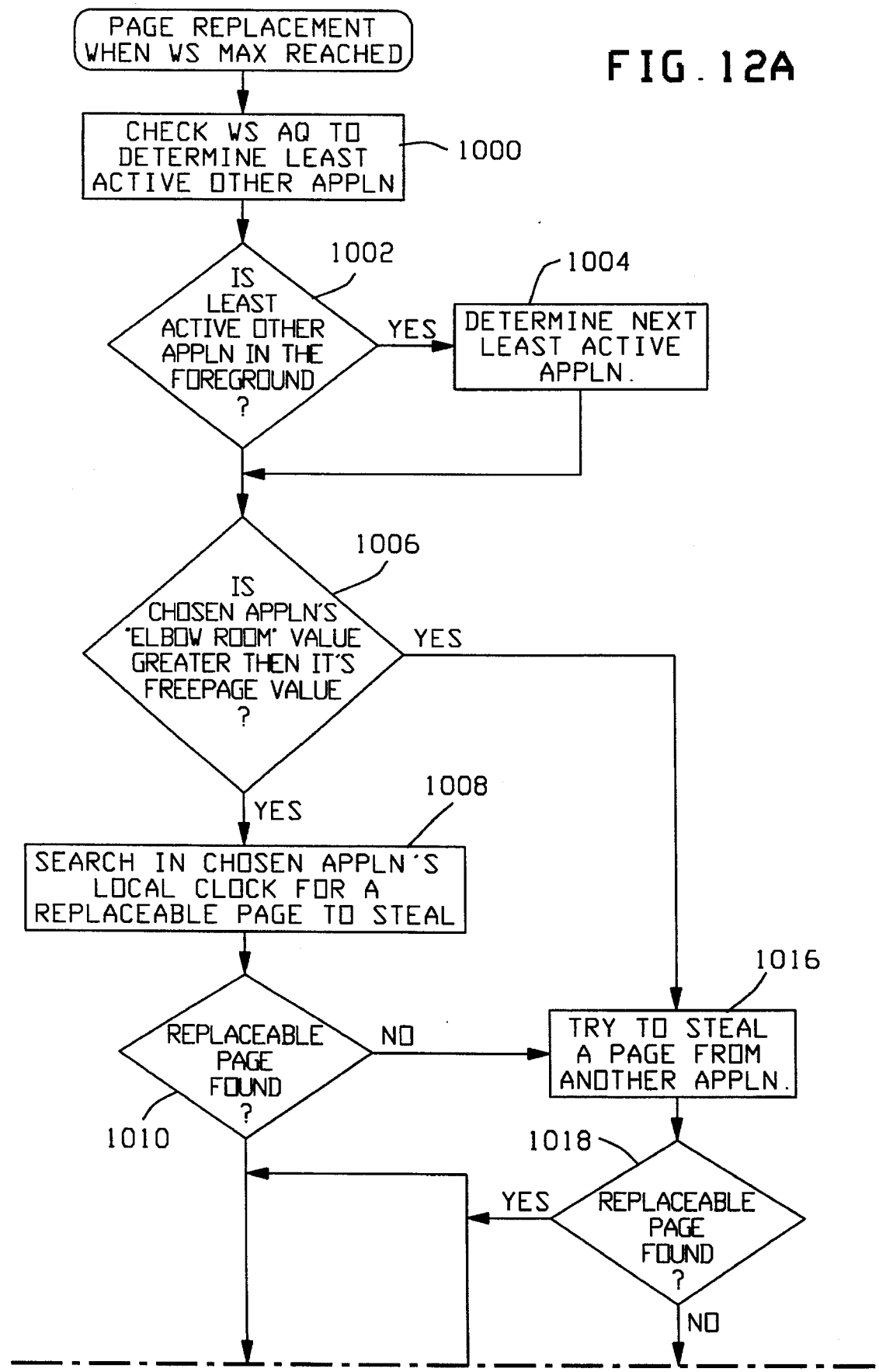

FIG. 12 is a flow chart illustrating how the previously described flow chart of FIG. 9 may be modified in accordance with the present invention when "elbow room" is provided as described above. It will be remembered that the flow chart of FIG. 9 corresponds to the page stealing situation arising when an application's page fault cannot be satisfied (even though the application's assigned page maximum has not been reached) because the workstation has used up its maximum number of assignable pages. The page faulting application thus tries to steal a page from another application.

Initially it is to be understood that Steps 1000, 1002 and 1004 in FIG. 12 may typically correspond to Steps 900, 902 and 904, respectively in FIG. 9. More specifically, in Step 1000, the workstation activity queue AQ' is checked to determine which of the other running applications least recently experienced a page fault. If, for example, application A1 experienced a page fault and is trying to steal a page from another application, the least active other application would be application A3, since column C4 in FIG. 11 shows a "1" for application A3.

The next Step 1002 in FIG. 12 corresponds to Step 902 in FIG. 9, wherein a check is made to determine whether the application selected for stealing by the previous Step 1000 is operating in the foreground. If so, operation detours to Step 1004 (as occurs with respect to Step 904 in FIG. 9) in order to select the application (other than application A1 which is trying to steal a page) having the next most recent page fault. Since column C2 of FIG. 11 shows that application A3 chosen in Step 1000 is not in the foreground, the flow proceeds to Step 1006 in FIG. 12, which is where the "elbow room" factor of the present invention is taken into account.

Step 1006 in FIG. 12 determines whether the application selected as a candidate for stealing in the previous steps has an "elbow room" value which is greater than the chosen application's number of free pages. For example, application A3 in FIG. 11 has 5 free pages (column C3) and an "elbow room" value of 2 (column C5). Thus, if application A3 is the chosen application, the flow will proceed to Step 1008 in FIG. 12 to try and steal a page therefrom.

If on the other hand, application A1 is the one chosen in Step 1002 (or Step 1004), the number of free pages (2 in column C3 of FIG. 11) will not exceed its "elbow room" value (3 in column C5), in which case application A1 would be skipped for page stealing. The flow in FIG. 12 would then proceed to Step 1016 to try other approaches for selecting an application for page stealing. These other approaches will be considered hereinafter.

For now, it will be assumed that Step 1006 in FIG. 12 selects application A3 as the candidate application for page stealing, in which case the flow in FIG. 12 proceeds to Step 1008. In Step 1008 (similar to Step 906 in FIG. 9), a search for a replaceable page is made in the local clock of application A3, which may be accomplished in a similar manner to that previously described in connection with FIGS. 3–5 and 8.

If Step 1010 determines that a replaceable page was found in Step 1008 of FIG. 12, then the flow proceeds to Steps 1012 and 1014 in FIG. 12, which may be similar to Steps 910 and 912, respectively, in FIG. 9. In Step 1012, a page is stolen from application A3 selected for page stealing and assigned to application A1 which caused the page fault, following which the requested "not present" page is then read in. In Step 1014, application A1 is restarted, since the page fault has been resolved.

However, if Step 1010 in FIG. 12 determines that a replaceable page was not found in the local clock of application A3 (which was chosen for page stealing) then the flow proceeds to Step 1016 to determine another application from which to try to steal a page. Note that the flow also proceeds to Step 1016 as a result of the previously considered Step 1008 in FIG. 12 determining that there is insufficient "elbow room" in the application selected for page stealing by Steps 1000, 1002 and 1004.

Various strategies may be employed in Step 1016 in FIG. 12 for selecting the next application for page stealing. One approach is to select the next application for page stealing by repeating the previously described Steps 1000, 1002, 1004 and 1006, beginning with the application which next least recently experienced a page fault, and repeating until a suitable application is found for page stealing. Step 1018 determines whether a replaceable page can be found using this approach. If so, the flow proceeds to Steps 1012 and 1014 to satisfy the page fault, as previously described.

However, if Step 1018 in FIG. 12 determines that no replaceable page can be found in any other application suitable for page stealing, then the flow proceeds to Steps 1020 and 1022 in FIG. 12, wherein an attempt is made to find a replaceable page in the local clock of the application which caused the page fault, as previously described in connection with Steps 918 and 920 in FIG. 9. If even this does not result in finding a replaceable page, then Step 1022 in FIG. 12 provides an error indication. Alternatively, before producing this error indication, another search of the other applications could be made, in the same manner as previously described with respect to FIG. 9, since a page that was not previously replaceable might have become replaceable. Such a search could be performed before searching the local clock of the application which caused the fault.

It will be evident from the foregoing description of preferred embodiments of the inventions disclosed in the aforementioned applications Ser. Nos. 08/017,068 and 08/100,186 that page cleaning performance can significantly affect paging effectiveness, since dirty pages cannot be used for page replacement, as described previously herein. The aforementioned application Ser. No. 08/176,139 provides a particularly advantageous way of achieving this page cleaning so as to increase page availability, as will now be described with respect to the preferred embodiment disclosed therein.

It will be remembered that a "dirty" page is a page on which new data has been written, but which page and its new data has not been written back onto permanent storage, such as a disk drive located either at the workstation or at the workstation server. Since a page is normally stored in a volatile RAM memory, any new data written on the page can be lost if not returned to permanent storage. Thus, until a dirty page is written back to permanent memory, the page table (FIG. 3) maintains the dirty bit $d_i$ set to indicate that the page contains written-to data which must be written back to permanent storage.

Refer again to the flowchart of FIG. 5 which illustrates how an application searches its local clock for a replaceable page when the application has already used up its maximum number of assigned pages. As previously described, each time the local clock pointer cp advances to a new page (Step 500), the page access bit $a_i$ is tested (Step 502) to determine whether the page was referenced by the application since the last test. If $a_i$ is not set, the setting of the dirty bit $d_i$ of the page is then examined (Step 506). If $d_i$ is found to be set, the page is dirty and is therefore not replaceable. The page is then placed on the page cleaning queue PCQ (Step 510), $d_i$ of the page is reset, and the page is marked as being cleaned, such as by providing a "cleaning in progress" indication in the "Other Page Info" portion of the page table shown in FIG. 3. The clock pointer cp then advances to the next page. While a page is being cleaned, it remains available for use by the application. Although $d_i$ of the page has been reset, the page will not be allowed to be replaced because the page's "cleaning in progress" indication is also checked and will prevent replacement while the page is being cleaned. Dirty pages are placed on the page cleaning queue PCQ in a similar manner by other applications running on the workstation.

Figure 13:
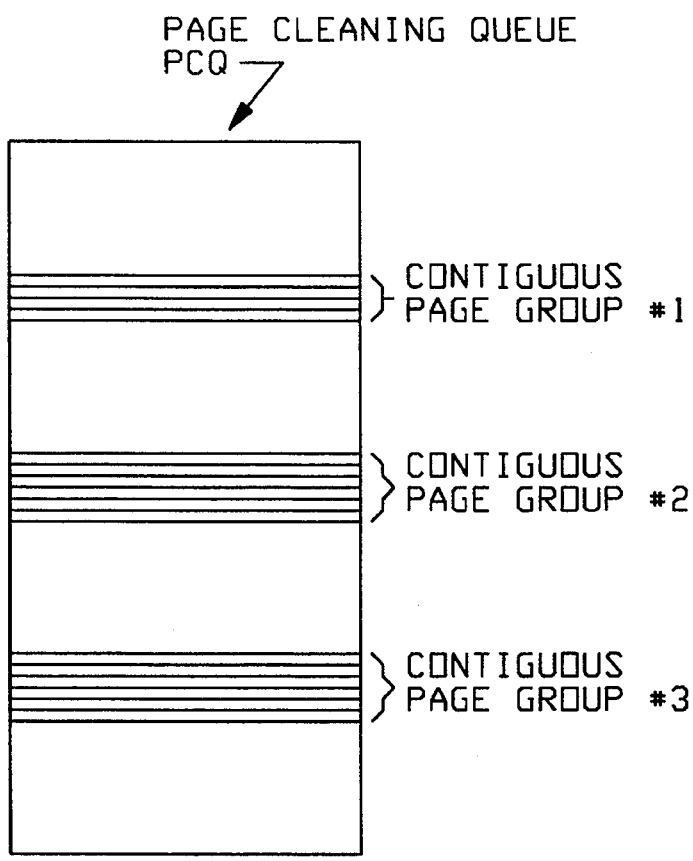
FIG. 13 is a schematic diagram of a page cleaning queue PCQ.

Referring next to FIG. 13, illustrated therein is a block and schematic diagram illustrating the manner in which addresses of pages to be cleaned are ordered in the page cleaning queue PCQ. As indicated by the consecutive page groups #1, #2 and #3 in FIG. 13, the pages to be cleaned are ordered based on their physical permanent storage address. Since the CTOS operating system allocates contiguous pages to applications in the largest blocks possible, such groups of contiguous pages typically occur in the page cleaning queue. The advantage of having such groups of contiguous strings will become evident shortly.

Figure 14:
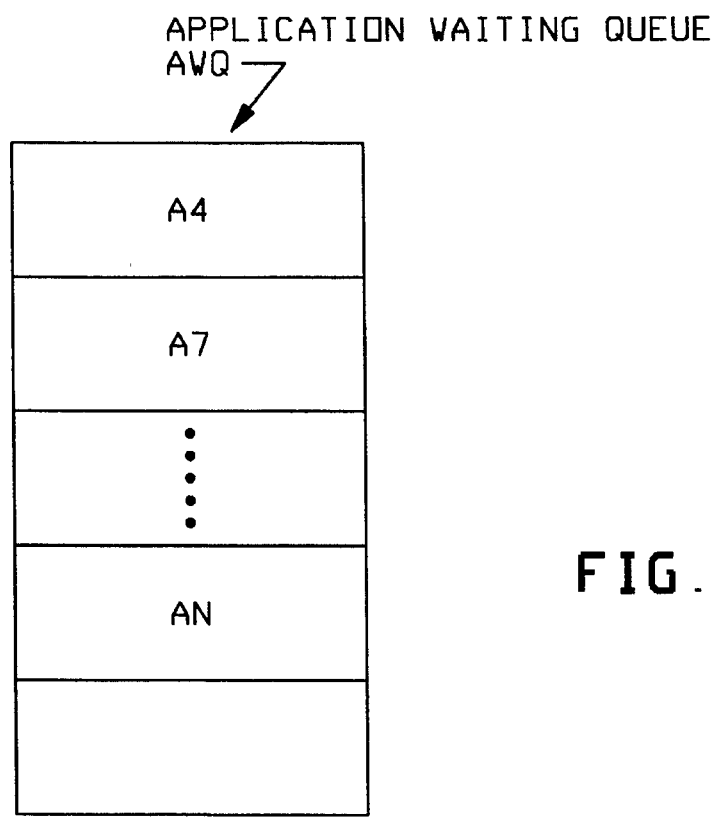
FIG. 14 is a schematic diagram of an application waiting queue AWQ.

Associated with the page cleaning queue PCQ is an application waiting queue AWQ, such as illustrated in FIG. 14 which shows applications A4, A11, A6 and AN waiting therein. An application is placed in AWQ when the application searches for a replaceable page, fails to find one, and chooses to wait for a page to be cleaned, such as illustrated at Step 812 in FIG. 8. A first-in-first-served priority is normally provided for queued applications. However, it is within the scope of the present invention to provide different priorities.

Having described the ordering of pages in the page cleaning queue PCQ with reference to FIG. 13, and the queuing in AWQ of applications waiting for a page to be cleaned with reference to FIG. 14, the manner in which page cleaning is initiated will next be described with reference to FIGS. 15–17.

It is important in determining when to initiate page cleaning to provide adequate page cleaning without excessively burdening the system with page cleaning operations. The preferred embodiment achieves an appropriate balance by providing for initiating page cleaning in three different ways. A first way is illustrated in FIG. 15 and is based on determining when an application reaches a certain threshold of dirty pages.

Figure 15:
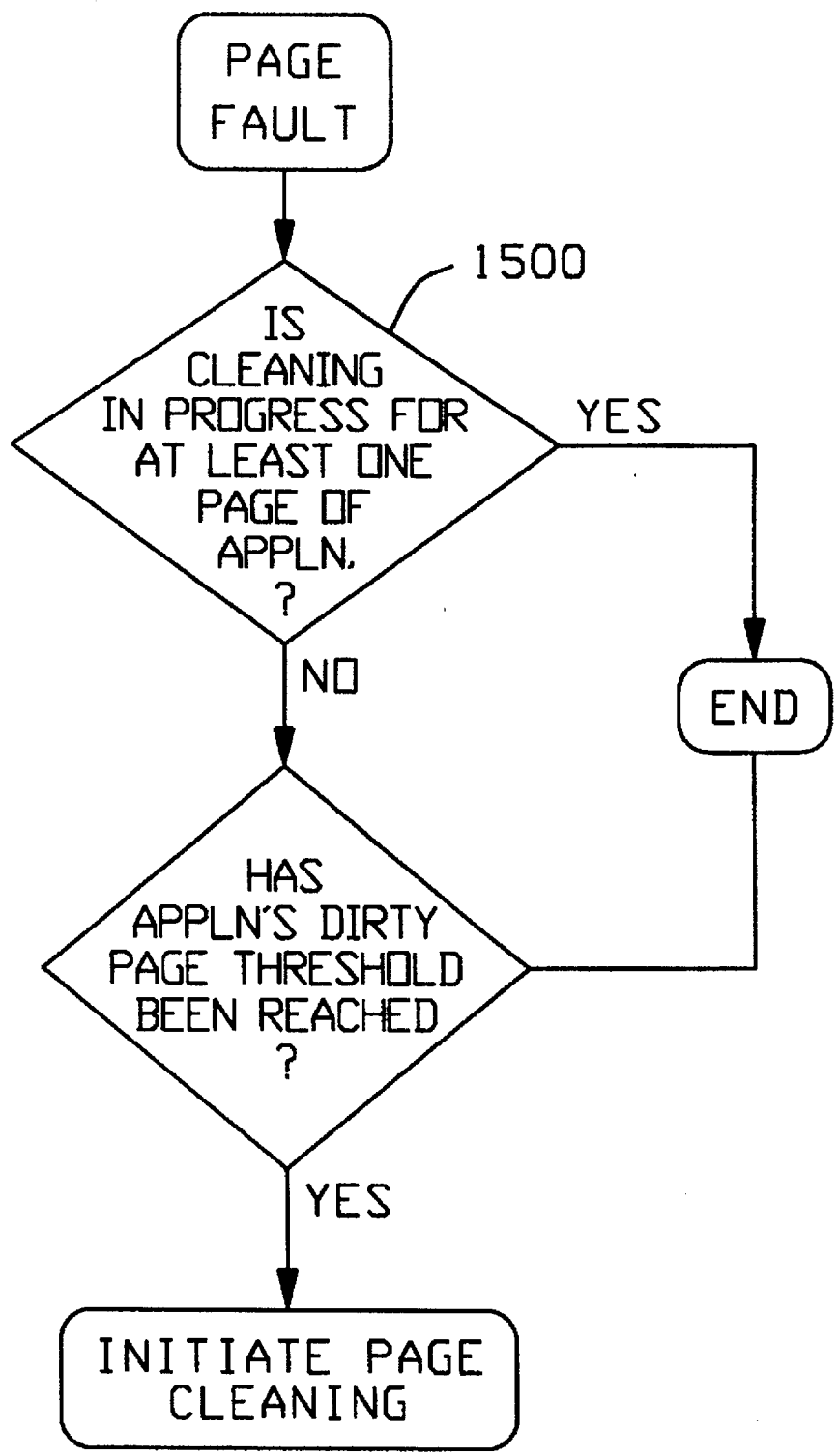
FIG. 15–17 are flow diagrams illustrating how page cleaning is initiated in a preferred embodiment.

As shown in FIG. 15, when an application experiences a page fault, a determination is made (Step 1500) as to whether the application is currently requesting a clean page. This may be accomplished by checking the page cleaning PCQ to see if cleaning is in progress for at least one page for that application. If a page is not currently being cleaned, the routine ends without initiating page cleaning (Step 1502).

If a page is not currently being cleaned, then the flow proceeds to Step 1504 in FIG. 15 to determine whether the application's dirty page threshold has been reached. If Step 1504 determines that the application's dirty page threshold has been exceeded, page cleaning is initiated, as shown. It is advantageous to base this threshold determination in Step 1502 on determining whether a predetermined dirty page minimum or a predetermined proportional dirty page minimum has been reached. For example, the predetermined dirty page minimum for an application may be set at 5 dirty pages, and the predetermined proportional dirty page minimum may be set at one-out-of-eight dirty pages. Thus, for an application having 50 total pages, the dirty page threshold would be 6 (i.e., 50/8), since 6 is greater than the dirty page minimum of 5. For an application having 20 pages, the dirty page threshold would be 5, since 5 is greater than the proportional dirty size minimum of 2 (i.e., 20/8).

Figure 16:
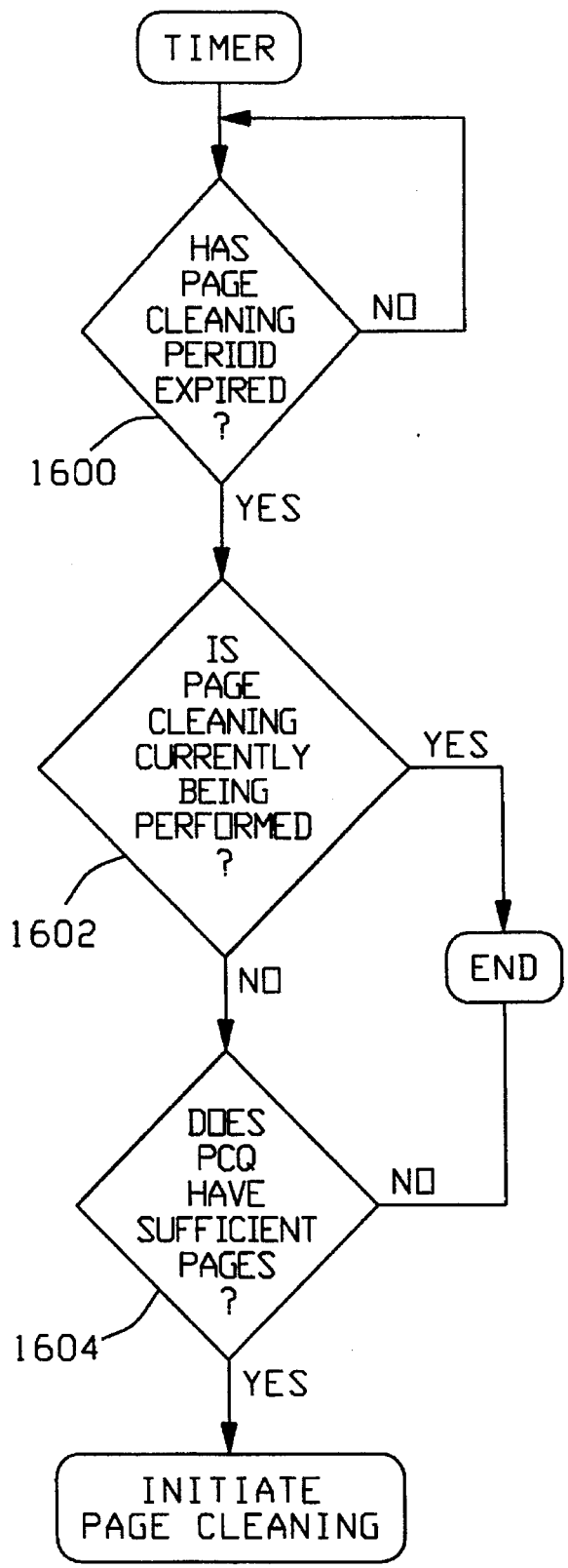

A second way of initiating page cleaning is illustrated in FIG. 16. Step 1600 continuously tests whether a predetermined time period has expired. This predetermined time period may typically be one second. If Step 1600 determines that this predetermined time period has expired, then the flow proceeds to Step 1602 to determine whether page cleaning is currently being performed. If so, the routine ends. If not, the flow proceeds to Step 104 which checks the page cleaning queue PCQ to determine whether there are a sufficient number of pages in the PCQ to justify initiating page cleaning. If not, the routine ends without initiating page cleaning. If there are sufficient pages, page cleaning is initiated, as shown.

Figure 17:
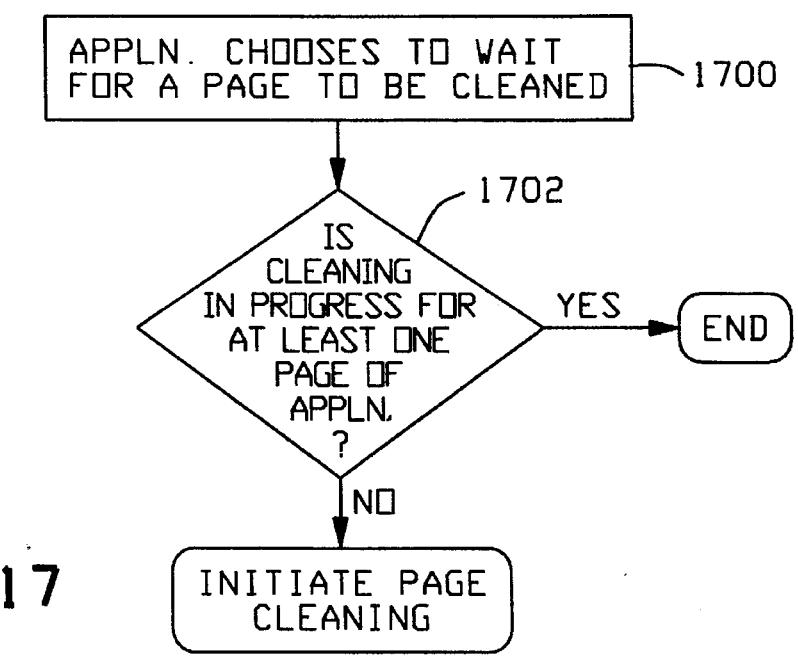

FIG. 17 illustrates a third way of initiating page cleaning. This third way occurs in response to the situation where an application searches for a replaceable page, but fails to find one, and then chooses to wait for a page to be cleaned, as illustrated at Step 812 in FIG. 8. It will be remembered, as described previously in connection with FIG. 14, that this situation causes the application to be placed on the application waiting queue AWQ shown in FIG. 14. In addition, when an application chooses to wait for a page to be cleaned (Step 1700 in FIG. 18), a check is made (Step 1702) as to whether or not the application has a page which is currently being cleaned. If so, the routine ends, since there is no need to initiate page cleaning. However, if the application has no page which is currently being cleaned, then page cleaning is initiated, as shown by Step 1704 in FIG. 17.

Figure 18:
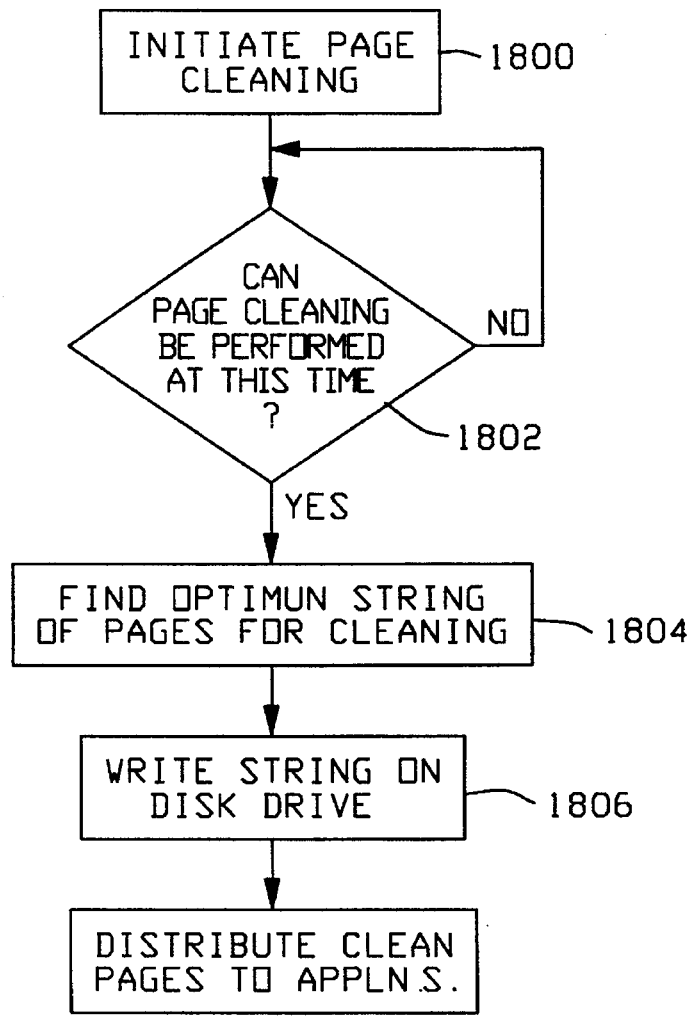
FIG. 18 is a flowchart illustrating various page cleaning steps performed in a preferred embodiment.

Having described the various ways that page cleaning is initiated in the preferred embodiment, reference is next directed to the flowchart of FIG. 18 which illustrates how the thus initiated page cleaning operation is advantageously accomplished in the preferred embodiment.

In FIG. 18, page cleaning initiation occurs in block 1800. This initiation of page cleaning may occur in any one of the three ways previously described in connection with FIGS. 15–17. After page cleaning is initiated, a test is made (Step 1802) to determine whether page cleaning can be performed in view of other system operations. If page cleaning can not be performed at that time, a waiting loop is entered. If page cleaning can be performed, operation proceeds to Step 1804 wherein the page cleaning queue PCQ (FIG. 13) is searched to find an optimum string of contiguous pages for writing in permanent storage.

The optimum string for page cleaning is chosen in a particularly advantageous manner in the preferred embodiment. It will be understood that the writing of data in permanent storage, such as a disk drive, is most expeditiously performed by writing a relatively large amount of contiguous data at one time. Typically, the largest size string of contiguous pages which can be written in a single operation on a system disk drive is 64,000 bytes, which in the preferred embodiment corresponds to 15 pages. Accordingly, for maximum writing efficiency, block 1804 in FIG. 18 searches the groups of pages in the cleaning queue PCQ for a string of 15 contiguous pages (i.e., pages having contiguous addresses) for writing on the disk drive in a single operation. As previously pointed out in connection with FIG. 13, dirty pages in PCQ are stored in sorted order so that contiguous pages can be easily formed into a string for writing.

If Step 1804 in FIG. 18 can not find a string of 15 contiguous dirty pages in PCQ, then the groups of dirty pages in PCQ are searched to determine whether a string of 15 contiguous pages can be formed by including clean pages in the string. For example, assume that a first group of contiguous pages contain pages having addresses 1000, 1001, and 1002, that a second group of contiguous pages contain pages having addresses 104, 105, 106, 107 and 108, and a third group of contiguous pages contain pages having addresses 111, 112, 113 and 114. In such case, a string for writing is formed comprised of the 15 pages 100 to 114 inclusive, which includes clean pages 103, 109 and 110. These clean pages are known as gap pages and may be any page in the system, a free page or a page in some application's local clock. Each corresponding page in its respective page table is marked "gap page." If this string including these gap pages were not formed, three separate writing operations (instead of only one) would be required in order to write these three groups of pages on the disk drive. Of course, lesser numbers of contiguous pages can be formed into a string for writing (with or without including clean pages) if 15 contiguous pages are not available.

The string of pages formed in Step 1804 (as described above) is written on the disk drive in a conventional manner (Step 1806). After writing, the resulting cleaned pages of the string are then appropriately distributed to the applications (Step 1808). Gap pages in the written string are freed as soon as the writing operation completes. Cleaned pages are given to waiting applications on the application waiting queue AWQ on a first-in-first-served basis. If a different priority is provided, this different priority will determine the distribution order. The remaining cleaned pages are returned to their applications. If a page has been dirtied during cleaning, its dirty bit di gets set again. If the application to which a cleaned page corresponds has been deactivated, the cleaned page is returned to the workstation's free page storage and entered on the free page list FPL (FIG. 10).

The present invention is directed to a still further improvement in the above described demand-paged virtual memory systems by providing for prefaulting in a novel and particularly advantageous manner such that it is made significantly more likely that a running application will find a requested page in its local clock.

The previous descriptions herein describe how, in response to an application experiencing a page fault, a "not present" page is brought into the application's local clock. Prefaulting, to which the present invention is directed, refers to additionally reading in one or more pages that were not requested with the speculation that these additionally read-in pages are likely to be requested by the application. The particularly advantageous manner in which this prefaulting is provided in accordance with the present invention will next be described with reference to the preferred embodiment illustrated in FIGS. 19–22.

Figure 19:
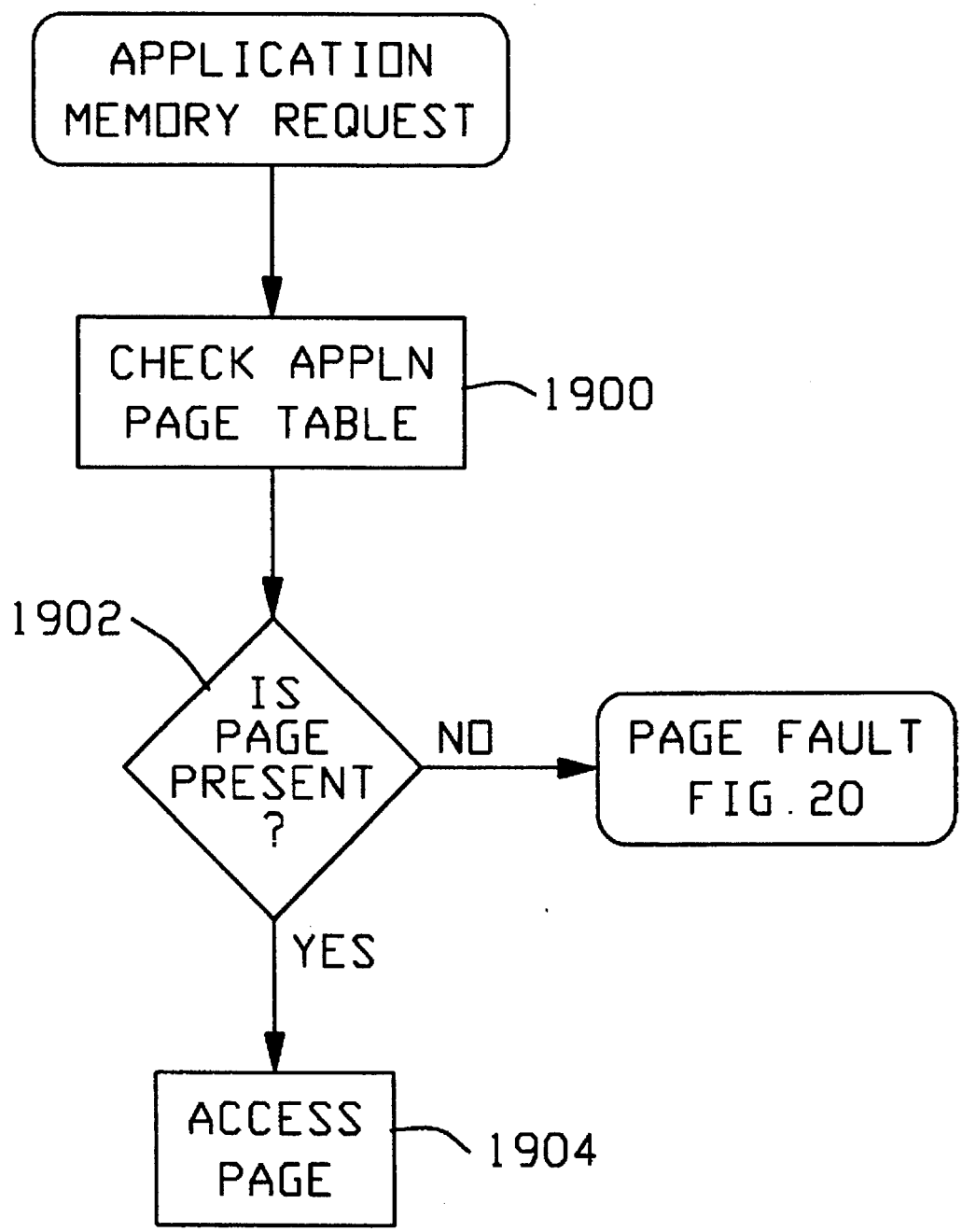
FIG. 19 is a flowchart illustrating the occurrence of a page fault as a result of an application requesting a "not present" memory page.

FIG. 19 is a flowchart illustrating how a page fault typically occurs for a running application. As shown in FIG. 19, whenever a running application requests an access, the application's page table is checked (Step 1900) to determine whether the page containing the information to be accessed is present in one of the application's assigned pages. If the page is found to be present (Step 1902), the page is accessed by the application (Step 1904). Otherwise, a page fault occurs causing operation to proceed to the flowchart of FIG. 20, which illustrates how a page fault is handled with the enhanced prefaulting provided by the present invention.

Figure 20:
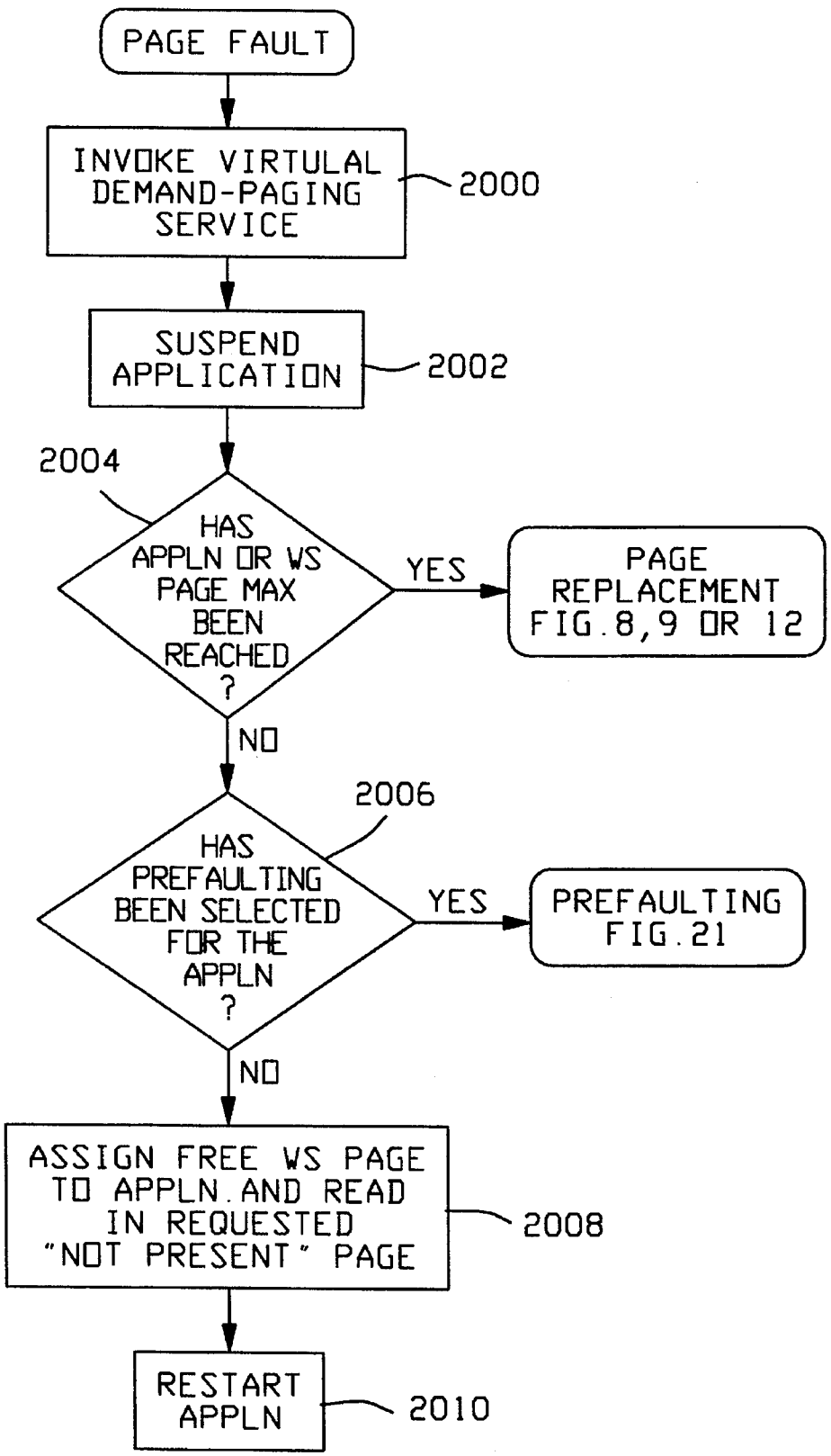
FIG. 20 is a flowchart illustrating operations occurring in response to a page fault in a demand-paged system providing prefaulting.

As illustrated in FIG. 20, the occurrence of a page fault invokes the virtual demand-paging service (Step 2000) which suspends performance of the application that caused the fault (Step 2002). The paging service then checks to determine whether either the application or workstation page maximum has been reached (Step 2004). If so, prefaulting would not be appropriate since, in either case, there is insufficient room for prefaulted pages. In such case operation proceeds to provide for page replacement as previously described herein in connection with FIGS. 8, 9 and 12.

If Step 2004 in FIG. 20 finds that neither the application nor workstation page maximum has been reached, operation then proceeds to Step 2006 wherein a check is made to determine whether prefaulting has been selected for the application which experienced the page fault, since it may be chosen not to provide prefaulting for a particular application. If prefaulting is not selected for the application which experienced the page fault, operation then proceeds to Step 2008, wherein a free (unassigned) workstation memory page (indicated in the free page list FPL in FIGS. 2 and 10) is assigned to the application's local clock, following which the requested "not present" page is read into the assigned page and the application then restarted (Step 2010). On the other hand, if prefaulting has been selected for the application which caused the page fault then, as indicated in FIG. 20, operation proceeds to FIG. 21, which is a flowchart illustrating how enhanced prefaulting is provided in a preferred embodiment.

Figure 21:
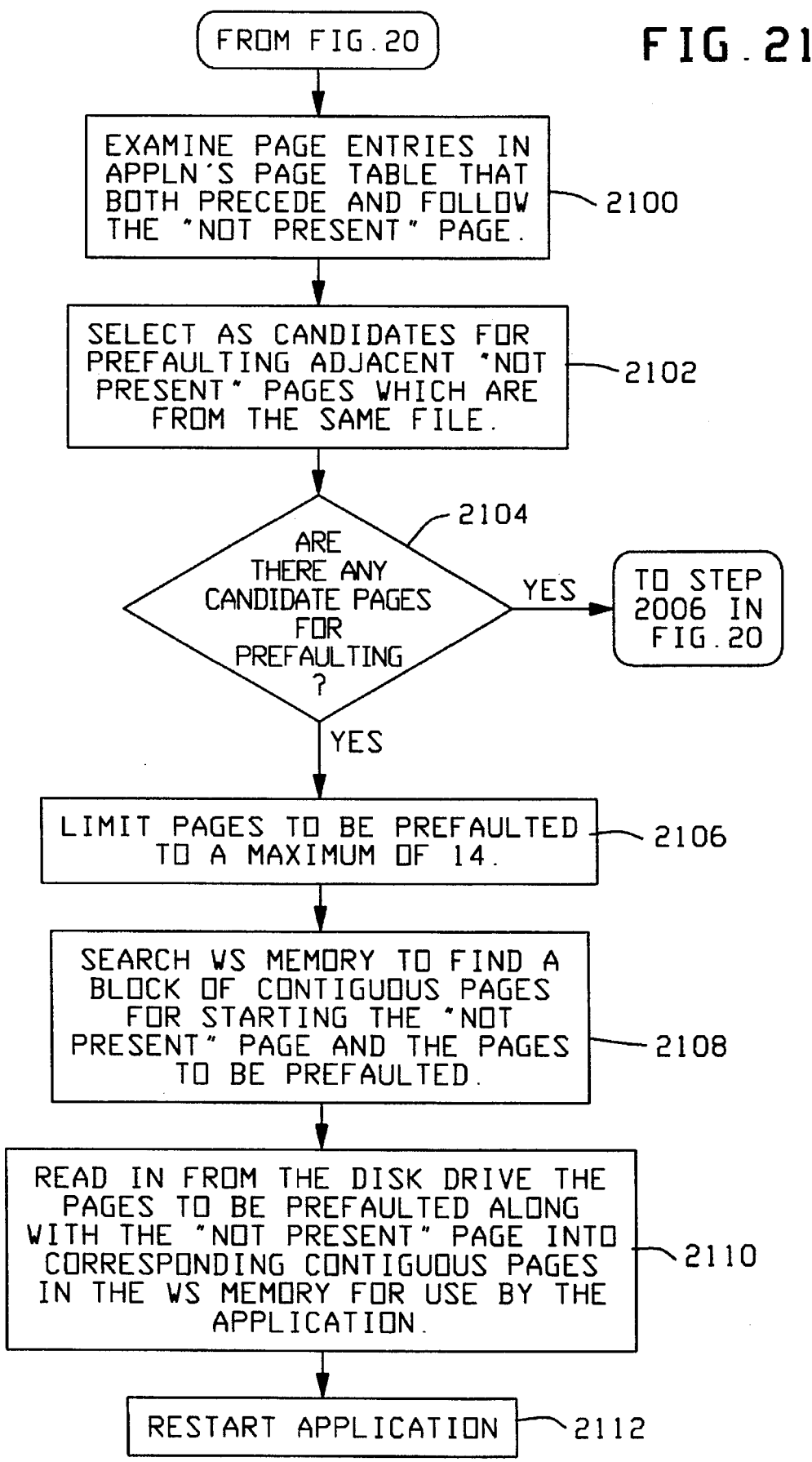
FIG. 21 is a flowchart illustrating how enhanced prefaulting is provided in a preferred embodiment of the invention.

It will be understood from the foregoing that the flowchart of FIG. 21 is reached when an application experiences a page fault, when neither the application nor the workstation has reached its page maximum, and when the application has been selected for prefaulting. As indicated in Step 2100 of FIG. 21, prefaulting begins by examining page entries in the application's page table that both precede and follow the page found to be "not present." Then, as indicated in Step 2102 in FIG. 21, consecutive adjacent "not present" pages from the same file are selected as candidates for prefaulting.

FIG. 22 is an exemplary portion of a page table which will be used to illustrate the operations indicated in Steps 2100 and 2102 of FIG. 21. In FIG. 22, the "Page Present" and "File" columns may, for example, be part of the "Other Page Info" column in the page table shown in FIG. 3. A "1" in the "Page Present" column indicates that the page is "present", while a "0" indicates that the page is "not present". The "File" column identifies the file from which each page was obtained.

It is assumed in FIG. 22 that page 18 is the page which the application found to be "not present" and which produced the page fault. Pages 14–17 in FIG. 22 are representative of adjacent pages which precede the "not present" page 18, while pages 19–23 are representative of adjacent pages which follow the "not present" page 18. Such adjacent page entries are examined in Step 2100 in FIG. 21. The selection of pages for prefaulting in accordance with Step 2102 requires that the adjacent pages be "not present" and in the same file. Note in FIG. 22 that only the six pages 16–21 meet these requirements, and will thus be chosen as candidates for prefaulting.

Following Step 2102 in FIG. 21, operation proceeds to Step 2104 which determines whether any candidate pages have been found for prefaulting, that is, whether there is any page or pages besides the requested "not present" page (page 18 in FIG. 22) which meets the requirements of Step 2102. If not, operation proceeds to Step 2008 and 2010 in FIG. 20, which provide for resolving the page fault without prefaulting, as described previously.

If Step 2104 in FIG. 21 finds that there is at least one candidate page for prefaulting, then operation proceeds to Step 2106 which limits the pages to be prefaulted to a predetermined maximum number, which may typically be 14 pages. The number 14 is chosen since it is assumed that the reading operation in the preferred embodiment provides for reading a maximum of 15 pages from an associated disk drive (or a disk drive on a remote server). Adding the requested "not present" page to these 14 prefaulted pages provides the desired maximum of 15 pages for reading from a disk drive. Preferably, when there are more than 14 candidate pages for prefaulting candidate pages following the requested "not present" page are chosen ahead of those preceding the requested "not present" page. For example, if there are 10 candidate pages following the requested "not present" page and 8 candidate pages preceding the requested "not present" page, the 10 following candidate pages along with the nearest 4 of the preceding candidate pages will be selected for prefaulting.

Following Step 2106 in FIG. 21, the flow proceeds to Step 2108 wherein the workstation memory M (FIGS. 2 and 10) is searched to find a block of contiguous pages in memory for storing the "not present" page and the pages selected for prefaulting in Step 2106. If less than the desired number of contiguous pages are found, the number of pages to be prefaulted is reduced accordingly with the pages following the "not present" page being given preference as before.

In the next following Step 2110, the pages to be prefaulted and the not present page are read from the disk drive where they reside into the corresponding contiguous pages found in the workstation memory for use by the application which produced the page fault. For the example shown in FIG. 22, the pages read into contiguous pages of the workstation memory in Step 2110 would be pages 16–21. The application is then restarted, as indicated by Step 2112 in FIG. 21.

The manner described above for providing prefaulting has been found to be highly advantageous. One important advantage is that the pages selected for prefaulting have been found to be highly likely to be requested by the application. A further important advantage is that providing for reading of a block of prefaulted pages into corresponding contiguous pages of the workstation memory, up to the maximum number of pages that can be read by the system, permits a relatively large number of pages to be prefaulted in essentially the same time as would be required to read in a single requested "not present" page.

It is to be understood that the above description of enhanced prefaulting in a CTOS system providing virtual demand paging is only exemplary, since many modifications and variations in construction, arrangement and use are possible within the scope of the invention.

Accordingly, the present invention is to be considered as encompassing all possible modifications and variations coming within the scope of the appended claims.

What is claimed is:

1. A method of controlling paging on a workstation capable of concurrently running a plurality of applications, said method comprising the steps of:

providing a workstation memory;

dividing said workstation memory into a plurality of pages having files stored therein;

maintaining a page table for each running application indicating corresponding files and pages and also whether each page is present;

providing non-volatile storage for storing not present pages;

assigning pages of said workstation memory to each running application;

providing a page fault when a running application requests access to a page which said page table indicates is not present;

determining whether a free page is available for storing the not present page of the page faulting application;

when a free page is determined to be available to store the not present page, then examining the page table of the page faulting application with respect to adjacent pages both preceding and following the not present page which caused the page fault;

selecting as candidate pages for prefaulting consecutive not present adjacent pages both following and preceding said not present page which are also from the same file as the not present page;

searching said workstation memory to find an available block of contiguous pages for storing the not present page and the adjacent candidate pages; and reading in from said non-volatile storage the not present page which produced the page fault and the maximum number of adjacent candidate pages that can be accommodated by the block found by said searching.

2. The method of claim 1, including the step of selectively providing a prefetching capability for a running application, and wherein the steps of examining, selecting, searching and reading are performed for an application when the application has been provided with a prefaulting capability.

3. The method of claim 1, including the step of:

when the step of examining does not find any candidate pages for prefaulting, then reading the not present page from said non-volatile storage into the free page found by said determining without performing the steps of selecting and searching.

4. The method of claim 1, including the step of limiting said candidate pages to a predetermined maximum number.

5. The method of claim 4, wherein said predetermined maximum number is chosen based on the maximum number of pages which can be read from said non-volatile storage during a reading operation.

6. The method of claim 4, wherein the step of limiting chooses candidate pages for prefaulting such that candidate pages following the not present page are chosen ahead of those preceding the not present page.

7. The method of claim 1, including the steps of:

when a free page is determined not to be available to store the not present page of a faulting application, then searching the pages of the page faulting application using a clock algorithm to locate a page which is replaceable; and when said searching does not find a replaceable page in the page faulting application, then searching the pages of other running applications to locate a replaceable page for use by the page faulting application for storing the not present page;

said searching of said other running applications occurring in a selection order based on their page faulting activity; and reading in from said non-volatile storage the not present page into the located replaceable page.

8. The method of claim 7, wherein said searching of said other running applications begins with the one of said other running applications which least recently experienced a page fault.

9. The method of claim 8, wherein said searching of said other running applications includes selecting a next one of said other running applications for searching when no available replaceable page is found in a previously searched application.

10. A method in accordance with claim 7, wherein said selection order is additionally based on whether any of said other running applications is running in the background foreground.

11. A method in accordance with claim 7, wherein said workstation is a CTOS workstation.

* * * * *